United States Patent
Oka et al.

(10) Patent No.: US 10,695,793 B2
(45) Date of Patent: Jun. 30, 2020

(54) METHOD FOR FORMING MULTILAYER COATING FILM

(71) Applicant: NIPPON PAINT AUTOMOTIVE COATINGS CO., LTD., Osaka (JP)

(72) Inventors: Miho Oka, Hirakata (JP); Makoto Shimizu, Hirakata (JP); Yoshiki Takaira, Hirakata (JP); Manabu Horiuchi, Hirakata (JP); Daisuke Segawa, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 194 days.

(21) Appl. No.: 16/072,902

(22) PCT Filed: Jan. 26, 2017

(86) PCT No.: PCT/JP2017/002777
§ 371 (c)(1),
(2) Date: Jul. 26, 2018

(87) PCT Pub. No.: WO2017/131100
PCT Pub. Date: Aug. 3, 2017

(65) Prior Publication Data
US 2019/0030563 A1 Jan. 31, 2019

(30) Foreign Application Priority Data
Jan. 27, 2016 (JP) .................................. 2016-013673

(51) Int. Cl.
| B05D 1/36 | (2006.01) |
| B05D 7/24 | (2006.01) |
| B05D 3/02 | (2006.01) |
| B32B 15/095 | (2006.01) |
| B32B 27/28 | (2006.01) |
| B32B 27/40 | (2006.01) |
| B32B 27/42 | (2006.01) |
| C09D 5/00 | (2006.01) |
| C09D 161/28 | (2006.01) |
| C09D 175/04 | (2006.01) |
| B32B 15/08 | (2006.01) |
| C09D 179/00 | (2006.01) |
| C09D 133/06 | (2006.01) |

(52) U.S. Cl.
CPC .................. *B05D 1/36* (2013.01); *B05D 3/02* (2013.01); *B05D 7/24* (2013.01); *B32B 15/08* (2013.01); *B32B 15/095* (2013.01); *B32B 27/28* (2013.01); *B32B 27/40* (2013.01); *B32B 27/42* (2013.01); *C09D 5/00* (2013.01); *C09D 133/066* (2013.01); *C09D 161/28* (2013.01); *C09D 175/04* (2013.01); *C09D 179/00* (2013.01)

(58) Field of Classification Search
None
See application file for complete search history.

(56) References Cited

U.S. PATENT DOCUMENTS

| 6,428,856 B1 | 8/2002 | Masuda et al. | |
| 2009/0171016 A1 * | 7/2009 | Sato | C08K 5/29 |
| | | | 524/608 |

FOREIGN PATENT DOCUMENTS

| JP | 2001-9357 | 1/2001 |
| JP | 2001-11151 | 1/2001 |
| JP | 2001-11152 | 1/2001 |
| JP | 2003-201442 | 7/2003 |
| JP | 2003-306476 | 10/2003 |
| JP | 2009-516638 | 4/2009 |
| JP | 2009-262002 | 11/2009 |
| JP | 2011-094102 | 5/2011 |
| JP | 2011-131135 | 7/2011 |
| JP | 2013-60577 | 4/2013 |
| JP | 2013-133445 | 7/2013 |
| JP | 2015-174958 | 10/2015 |
| WO | 2013/027093 | 2/2013 |

OTHER PUBLICATIONS

International Search Report dated Mar. 28, 2017 in International (PCT) Application No. PCT/JP2017/002777.
Extended European Search Report dated Jul. 24, 2019 in European Patent Application No. 17744330.6.
International Prelminary Report on Patentability dated Aug. 9, 2018 in International Application No. PCT/JP2017/002777.

* cited by examiner

*Primary Examiner* — Michael P. Rodriguez
(74) *Attorney, Agent, or Firm* — Wenderoth, Lind & Ponack, L.L.P.

(57) ABSTRACT

The present invention provides a method for forming a multilayer coating film including an intermediate coating film formation step of applying an aqueous intermediate coating composition to an object to be coated to form an uncured intermediate coating film; a base coating film formation step of applying an aqueous base coating composition onto the resulting uncured intermediate coating film to form an uncured base coating film; and a curing step of curing the resulting uncured intermediate coating film and the base coating film by heating.

10 Claims, No Drawings

METHOD FOR FORMING MULTILAYER COATING FILM

TECHNICAL FIELD

The present invention relates to a method for forming a multilayer coating film using an aqueous intermediate coating composition and an aqueous base coating composition.

BACKGROUND OF THE INVENTION

On the surface of an object to be coated such as an automobile body, a plurality of coating films having various roles are formed sequentially, and thus the object to be coated is protected, as well as beautiful appearance and an excellent design. A common method for forming such a plurality of coating films, e.g., for a steel plate, is a method in which an undercoating film such as an electrodeposition coating film is famed on an object to be coated that is excellent in conductivity, and then an intermediate coating film, a base coating film, and a clear coating film are formed thereon one after another.

In view of further request for reducing burden on the environment such as energy saving and reduction in $CO_2$ emission, it is required to lower a heat curing temperature in a coating film formation. Moreover, in automobile manufacturing fields, further reduction in weight of an automobile body is required according to the development of electric vehicles. The reduction in weight of an automobile body brings about an improvement in fuel economy, and therefore, it is also effective in terms of energy saving and reduction in $CO_2$ emission. One way to reduce the weight of an automobile body is to replace a steel plate part with a resin part.

In conventional coating for steel plates and resin members, it is common that different coating compositions are used respectively in consideration of the characteristics and softening temperature of each member. On the other hand, in coating of automobile bodies, for the purposes of simplifying coating step and coating management and improving hue consistency in a coated product, it has been demanded to commonize coating compositions to be used for coating various components. In the case of commonizing the coating composition for a steel plate and that for a resin member, however, it is necessary to adjust the curing temperature of the coating composition to a temperature lower than the conventional curing temperature in consideration of the heat resistance of the resin member. Moreover, in the case of forming a coating film on an object to be coated having both a steel plate part and a resin part, deformation may occur during heat curing due to a difference in thermal expansion coefficient between the members. Therefore, it is extremely important to lower the heat curing temperature and minimize the influence of the thermal history on each member in commonizing the coating composition.

On the other hand, lowering the heat curing temperature may reduce the crosslinking density of a resulting coating film and coating film performance such as water resistance and chipping resistance may deteriorate.

JP-A-2011-131135 (Patent Document 1) discloses a method for forming a multilayer coating film that involves applying an aqueous intermediate coating composition to a substrate having both a steel plate and a plastic substrate to form an intermediate coating film, then applying an aqueous base coating composition to the formed intermediate coating film to form a base coating film, then applying an organic solvent type clear coating composition to foul a clear coating film, and heating and curing the three layers, namely, the intermediate coating film, the base coating film, and the clear coating film, in which the aqueous base coating composition contains (a) an acrylic resin emulsion, (b) a water-soluble acrylic resin, (c) a melamine resin, and (d) a propylene glycol monoalkyl ether. A multilayer coating film obtained by this forming method may not exhibit sufficient chipping resistance when being cured, for example, at a temperature of 100° C. or less.

PRIOR ART DOCUMENT

Patent Document

Patent Document 1: JP-A-2011-131135

SUMMARY OF INVENTION

Problems to be Resolved by the Invention

The present invention solves the above-mentioned conventional problems and an object thereof is to provide a method for forming a multilayer coating film by which a multilayer coating film having excellent coating film performance can be formed even by low temperature curing.

Means of Solving the Problems

The present invention provides the following aspects to solve the aforementioned problems.

[1]
A method for forming a multilayer coating film, wherein the method comprises:
  an intermediate coating film formation step of applying an aqueous intermediate coating composition to an object to be coated to form an uncured intermediate coating film;
  a base coating film formation step of applying an aqueous base coating composition onto a resulting uncured intermediate coating film to form an uncured base coating film; and
  a curing step of curing the resulting uncured intermediate coating film and the base coating film by heating, wherein
  the aqueous intermediate coating composition is an aqueous intermediate coating composition comprising:
    an aqueous resin having a hydroxyl group and a carboxyl group (A1);
    a polyisocyanate compound (B); and
    a hydrophilicized-modified carbodiimide compound (C),
  the aqueous base coating composition is an aqueous base coating composition comprising:
    an aqueous resin having a hydroxyl group and a carboxyl group (A2);
    a melamine resin (D),
    a weak acid catalyst (E); and
    an aqueous polyurethane resin (F), wherein
  the aqueous resin having a hydroxyl group and a carboxyl group (A1) contained in the aqueous intermediate coating composition has a hydroxyl value of 80 to 200 mgKOH/g and an acid value of 10 to 40 mgKOH/g in terms of resin solid content,
  the aqueous resin having a hydroxyl group and a carboxyl group (A2) contained in the aqueous base coating composition has a hydroxyl value of 80 to 200 mgKOH/g in terms of resin solid content,
  the hydrophilicized-modified carbodiimide compound (C) is a compound represented by a formula (I), (II), or (III) below,

[Chemical Formula 1]

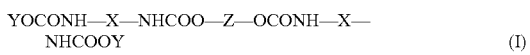

wherein each X is a bifunctional organic group having at least one carbodiimide group, Y is each same or different structure resulting from elimination of a hydroxyl group from a polyalkylene glycol monoalkyl ether, and Z is a structure resulting from elimination of a hydroxyl group from a bifunctional polyol having a number-average molecular weight of 200 to 5,000,

[Chemical Formula 2]

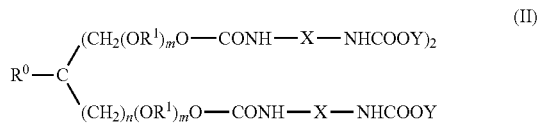

wherein each X is a bifunctional organic group having at least one carbodiimide group, Y is each same or different structure resulting from elimination of a hydroxyl group from a polyalkylene glycol monoalkyl ether, $R^0$ is hydrogen, a methyl group or an ethyl group, each $R^1$ is an alkylene group having 4 or less carbon atoms, n is 0 or 1, and each m is a number from 0 to 60,

[Chemical Formula 3]

wherein X is a bifunctional organic group having at least one carbodiimide group, and Y is each same or different structure resulting from elimination of a hydroxyl group from a polyalkylene glycol monoalkyl ether, the melamine resin (D) has an average imino group amount of 1.0 or more, and an average methylol group amount of 0.5 or more, per one melamine nucleus, a mass ratio of the aqueous resin (A2) and the melamine resin (D) contained in the aqueous base coating composition is in the range of (A2)/(D)=1 to 3 in terms of solid content, an amount of the weak acid catalyst (E) contained in the aqueous base coating composition is within the range of 0.1 to 10.0 parts by mass, based on 100 parts by mass of solid contents ((A2)+(D)) of the aqueous resin (A2) and the melamine resin (D) contained in the aqueous base coating composition, the aqueous polyurethane resin (F) has a glass transition point (Tg) of −50° C. or less, and a cured film of the aqueous polyurethane resin (F) has an elongation at break of 400% or more at −20° C.

[2]

The method for forming a multilayer coating film mentioned above, wherein a content of the hydrophilicized-modified carbodiimide compound (C) is 1 to 8% by mass based on a resin solid content of the aqueous intermediate coating composition.

[3]

The method for forming a multilayer coating film mentioned above, wherein a content of the aqueous polyurethane resin (F) is 15% by mass or more and 30% by mass or less based on a resin solid content of the aqueous base coating composition.

[4]

The method for forming a multilayer coating film mentioned above, wherein a ratio of an equivalent of a carbodiimide group of the hydrophilicized-modified carbodiimide compound (C) to an equivalent of an acid group of the aqueous resin (A1) contained in the aqueous intermediate coating composition is 0.1 to 0.6.

[5]

The method for forming a multilayer coating film mentioned above, wherein an amount of the weak acid catalyst (E) is within the range of 0.1 to 5.0 parts by mass, based on 100 parts by mass of solid contents ((A2)+(D)) of the aqueous resin (A2) and the melamine resin (D) contained in the aqueous base coating composition.

[6]

The method for forming a multilayer coating film mentioned above, wherein the weak acid catalyst (E) comprises a phosphate ester compound.

[7]

The method for forming a multilayer coating film mentioned above, wherein the aqueous base coating composition further comprises an aqueous resin (G) having a hydroxyl value of less than 80 mgKOH/g.

[8]

The method for forming a multilayer coating film mentioned above, wherein the object to be coated includes a steel plate part and a resin part.

[9]

The method for forming a multilayer coating film mentioned above, wherein the method further comprises a clear coating film formation step of applying a clear coating composition onto the uncured base coating film obtained in the base coating film formation step to form an uncured clear coating film, wherein the curing step is a step of curing the resulting uncured intermediate coating film, base coating film, and clear coating film by heating.

[10]

The method for forming a multilayer coating film mentioned above, wherein a heating temperature in the curing step is 70 to 120° C.

Advantageous Effect of the Invention

The method for forming a multilayer coating film of the present invention is advantageous in that a curing reaction proceeds well even under heating conditions of low temperature conditions (e.g., heating conditions at 100° C. or less), so that a cured coating film having excellent coating film properties can be obtained. The method for forming a multilayer coating film of the present invention can be used suitably for coating of an object to be coated having a steel plate part and a resin part, which is difficult to be subjected to high-temperature heat curing treatment but is required to be excellent in coating film properties (water resistance, chipping resistance, etc.).

DETAILED DESCRIPTION OF THE PREFERRED EMBODIMENTS

The method for forming a multilayer coating film of the present invention includes:

an intermediate coating film formation step of applying an aqueous intermediate coating composition to an object to be coated to form an uncured intermediate coating film;

a base coating film formation step of applying an aqueous base coating composition onto a resulting uncured intermediate coating film to form an uncured base coating film; and a curing step of curing the resulting uncured intermediate coating film and the base coating film by heating. The method for forming a multilayer coating film of the present invention is characterized in that by using the above-specified aqueous intermediate coating composition and the above-specified aqueous base coating composition in combination, a multilayer coating film having good water resistance and good chipping resistance can be obtained even when the aqueous coating compositions are baked and cured under low-temperature curing conditions, for example. In the following, the coating compositions to be used in the respective coating film formation steps are will be described.

Aqueous Intermediate Coating Composition

The aqueous intermediate coating composition to be used in the method of the present invention contains an aqueous resin having a hydroxyl group and a carboxyl group (A1), a polyisocyanate compound (B), and a hydrophilicized-modified carbodiimide compound, (C).

Aqueous Resin having Hydroxyl Group and Carboxyl Group (A1)

The aqueous resin having a hydroxyl group and a carboxyl group (A1) is a binder component that undergoes a curing reaction with the water-dispersible blocked polyisocyanate compound (B) and the hydrophilicized-modified carbodiimide compound (C). The aqueous resin having a hydroxyl group and a carboxyl group (A1) to be used in the present invention is required to have:

a hydroxyl value of 80 to 200 mgKOH/g in terms of resin solid content, and an acid value of 10 to 40 mgKOH/g in terms of resin solid content.

The hydroxyl value in terms of resin solid content may preferably be 80 to 160 mgKOH/g, and the acid value in terms of resin solid content may preferably be 15 to 35 mgKOH/g.

The aqueous resin having a hydroxyl group and a carboxyl group (A1) to be used in the present invention is high in hydroxyl value as compared with its acid value. Inclusion of such an aqueous resin (A1) as well as the components (B) to (C) offers an advantage that good chipping resistance is obtained even when the aqueous intermediate coating composition is applied and then cured at a low temperature.

The aqueous resin (A1) may be composed of a single resin satisfying the above requirement regarding a hydroxyl value and an acid value in terms of resin solid content or alternatively may be composed of two or more resins each satisfying the above requirement regarding a hydroxyl value and an acid value.

The aqueous resin (A1) has two types of functional groups, namely, a hydroxyl group and a carboxyl group, as reactive groups that participate in curing. In the aqueous intermediate coating composition in the present invention, the hydroxyl group of the aqueous resin (A1) reacts with the polyisocyanate compound (B) and the carboxyl group of the aqueous resin (A1) reacts with the hydrophilicized-modified carbodiimide compound (C).

The aqueous resin (A1) is not particularly limited with respect to its type as long as it satisfies the requirement regarding a hydroxyl group and a carboxyl group, but it may preferably be an acrylic resin and/or a polyester resin because these materials are easily produced and easily available. From the viewpoint of adjustment of coating film properties, it may be preferred to use an acrylic resin alone or a mixture of an acrylic resin and a polyester resin as the aqueous resin (A1). For example, in use as an intermediate coating composition, it may be more preferred to use a mixture of an acrylic resin and a polyester resin as the aqueous resin (A1). For example, in use as a top base coating composition, it may be more preferred to use an acrylic resin as the aqueous resin (A1).

Concerning the acrylic resin that can be used suitably as the aqueous resin (A1), a resin of interest can be obtained, for example, by subjecting to acrylic copolymerization monomers containing an $\alpha,\beta$-ethylenically unsaturated monomer having a hydroxyl group and an $\alpha,\beta$-ethylenically unsaturated monomer having a carboxyl group in such amounts that satisfy the requirement on the hydroxyl value and the acid value regarding the hydroxyl group and the carboxyl group.

Examples of the $\alpha,\beta$-ethylenically unsaturated monomer having a hydroxyl group include 2-hydroxyethyl (meth)acrylate, 2-hydroxypropyl (meth)acrylate, 4-hydroxybutyl (meth)acrylate, allyl alcohol, methacryl alcohol, and an adduct of hydroxyethyl (meth)acrylate and $\varepsilon$-caprolactone. Preferred among these may be 2-hydroxyethyl (meth)acrylate, 4-hydroxybutyl (meth)acrylate, and an adduct of hydroxyethyl (meth)acrylate and c-caprolactone. In the present description, "(meth)acryl" shall mean both acryl and methacryl.

Examples of the $\alpha,\beta$-ethylenically unsaturated monomer having a carboxyl group include acrylic acid, methacrylic acid, acrylic acid dimer, crotonic acid, 2-acryloyloxyethylphthalic acid, 2-acryloyloxyethylsuccinic acid, $\omega$-carboxypolycaprolactone mono(meth)acrylate, maleic acid, fumaric acid, and itaconic acid. Preferred among these are acrylic acid and methacrylic acid.

In the acrylic copolymerization for obtaining the aqueous resin (A1), other $\alpha,\beta$-ethylenically unsaturated monomer can be used if necessary. Examples of the above-described other $\alpha,\beta$-ethylenically unsaturated monomer include (meth)acrylic acid esters (e.g., methyl (meth)acrylate, ethyl (meth)acrylate, n-propyl (meth)acrylate, n-butyl (meth)acrylate, isobutyl (meth)acrylate, tert-butyl (meth)acrylate, 2-ethylhexyl (meth)acrylate, lauryl methacrylate, phenyl acrylate, isobornyl (meth)acrylate, cyclohexyl methacrylate, (meth)acrylic acid tert-butyl cyclohexyl, dicyclopentadienyl (meth)acrylate, and dihydrodicyclopentadienyl (meth)acrylate), and polymerizable amide compounds (e.g., (meth)acrylamide, N-methylol(meth)acrylamide, and N-butoxymethyl(meth)acrylamide).

The method for obtaining the aqueous resin (A1) may be a method in which an acrylic resin is obtained by performing solution polymerization and then the resulting material is subjected to hydrophilization or a method in which an emulsion is obtained by performing emulsion polymerization in an aqueous medium.

When an emulsion is obtained by performing emulsion polymerization, a crosslinking monomer can be used as the above-described other $\alpha,\beta$-ethylenically unsaturated monomer. The crosslinking monomer is a compound having two or more radically polymerizable, ethylenically unsaturated groups in its molecule, and examples thereof include divinylbenzene, allyl (meth)acrylate, and ethylene glycol di(meth)acrylate.

The solution polymerization mentioned above is commonly a method that involves stirring a solvent while dropping thereinto a mixture of $\alpha,\beta$-ethylenically unsaturated monomers to be used as raw materials together with a polymerization initiator under heating conditions. The conditions for the solution polymerization may include a polymerization temperature of 60 to 160° C. and a dropping time of 0.5 to 10 hours, for example. The α,β-ethylenically unsaturated monomers to be used as raw materials may be polymerized separately in two steps. In this case, the α,β-ethylenically unsaturated monomers to be used as raw materials are required as a whole to satisfy the requirement regarding a hydroxyl group and a carboxyl group.

The polymerization initiator mentioned above is not particularly limited as long as the polymerization initiator is used for common polymerization, and examples thereof include azo compounds and peroxides. Generally, an amount of the polymerization initiator relative to 100 parts by mass of the monomer mixture is 0.1 to 18 parts by mass, and preferably 0.3 to 12 parts by mass.

The solvent that can be used here is not particularly limited as long as the solvent does not affect the reaction adversely, and examples thereof include alcohols, ketones, ethers, and hydrocarbon solvents. Moreover, in order to adjust the molecular weight, a mercaptan such as lauryl mercaptan, or a chain transfer agent such as α-methylstyrene dimer may be used if necessary.

The acrylic resin thus obtained by solution polymerization may preferably have a number-average molecular weight of 4,000 to 20,000. In the present description, the number-average molecular weight of the acrylic resin obtained by solution polymerization can be measured by gel permeation chromatography (GPC) using a polystyrene standard sample.

The acrylic resin has a glass transition point (Tg) of preferably within a range of −20 to 80° C. The glass transition point of an acrylic resin can be determined by calculation from the type and amount of the monomers used for the preparation of the acrylic resin. The glass transition point of the acrylic resin may be measured with a differential scanning calorimeter (DSC).

The acrylic resin resulting from the solution polymerization described above is subjected to removal of the solvent if necessary, and then a basic material is added thereto and the resulting material is subjected to hydrophilization, so that the aqueous resin (A1) is obtained. Examples of the basic compound include ammonia, methylamine, ethylamine, dimethylamine, diethylamine, trimethylamine, triethylamine, dimethylethanolamine, diethanolamine, diethylaminoethanol, and triethanolamine. An amount of the basic compound to be added may preferably be adjusted such that a neutralization ratio relative to the carboxyl groups that the acrylic resin resulting from the solution polymerization has is 60 to 100%. When the neutralization ratio is less than 60%, the hydrophilization is insufficient and the storage stability may be poor. A resin solid content of the thus-obtained aqueous resin (A1) is commonly adjusted to 25 to 55% by mass.

The thus-obtained acrylic resin can be used in the form of an aqueous acrylic dispersion. Such an aqueous acrylic dispersion may preferably have a volume-average particle diameter within a range of 0.01 to 1 μm. The fact that the volume-average particle diameter is within the above range offers an advantage that the stability of the aqueous dispersion is improved and the appearance of a resulting coating film is also improved. The same applies to an acrylic emulsion described below, and the volume-average particle diameter can be adjusted through the adjustment of the monomer composition and/or the emulsion polymerization conditions.

When emulsion polymerization in an aqueous medium is performed during the preparation of the aqueous resin (A1), the polymerization can be carried out, for example, by dissolving an emulsifier in the aqueous medium containing water and, if necessary, an organic solvent such as an alcohol, and dropping a polymerization initiator and a mixture of the α,β-ethylenically unsaturated monomers to be used as raw materials with stirring under heat. The mixture of the α,β-ethylenically unsaturated monomers to be used as raw materials may be emulsified in advance using an emulsifier and water.

Examples of the polymerization initiator that can be suitably used for emulsion polymerization include lipophilic azo compounds (e.g., azobisisobutyronitrile, 2,2'-azobis(2-methylbutyronitrile), and 2,2'-azobis(2,4-dimethylvaleronitrile)); hydrophilic azo compounds (e.g., 4,4'-azobis(4-cyanovaleric acid) and 2,2-azobis(N-(2-carboxyethyl)-2-methylpropionamidine), which are anionic, and 2,2'-azobis (2-methylpropionamidine), which is cationic); redox-type lipophilic peroxides (e.g., benzoyl peroxide, parachlorobenzoyl peroxide, lauroyl peroxide, and tert-butyl perbenzoate); and redox-type hydrophilic peroxides (e.g., potassium persulfate and ammonium persulfate).

As the emulsifier, common emulsifiers that a person skilled in the art usually uses can be used. Particularly preferred as the emulsifier may be reactive emulsifiers, e.g., Antox MS-60 (produced by Nippon Nyukazai Co., Ltd.), Eleminol JS-2 (produced by Sanyo Chemical Industries, Ltd.), ADEKA REASOAP NE-20 (produced by ADEKA, Inc.), Aqualon HS-10 (produced by Dai-Ichi Kogyo Seiyaku Co., Ltd.), and LATEMUL PD-104 (produced by Kao Corporation). Moreover, in order to adjust the molecular weight, mercaptan such as lauryl mercaptan, or a chain transfer agent such as α-methylstyrene dimer may be used if necessary.

A reaction temperature is determined depending on an initiator, and for example, the reaction temperature is 60 to 90° C. for azo initiators or peroxides and may preferably be 30 to 70° C. for redox type initiators. Generally, a reaction time is 1 to 8 hours. Generally, an amount of the initiator relative to 100 parts by mass of the monomer mixture is 0.1 to 5% by mass. The emulsion polymerization may be performed in multiple steps, for example, in two steps. That is, a portion of the mixture of the α,β-ethylenically unsaturated monomers to be used as raw materials is subjected to emulsion polymerization, and then the remainder of the α,β-ethylenically unsaturated monomer mixture is added thereto and subjected to further emulsion polymerization.

From the viewpoint of storage stability, the emulsion can be used at pH 5 to 10 through neutralization with a basic compound. The basic compound may be the same as that to be used in the hydrophilization of the acrylic resin obtained in the preceding solution polymerization. The neutralization may preferably be carried out by adding the aforementioned basic compound to the system before or after the emulsion polymerization.

When an acrylic emulsion is used as the aqueous resin (A1), the acrylic emulsion may preferably have a number-average molecular weight of 10,000 to 80,000. The fact that the acrylic emulsion has a hydroxyl value of 80 to 200 mgKOH/g, an acid value of 10 to 40 mgKOH/g and a number-average molecular weight within a range of 10,000 to 80,000 offers an advantage that coating material stability is kept good and the crosslinking density in a resulting coating film falls into a better range. This is considered to be because the low-temperature curability of the polyisocyanate compound (B) that reacts with the hydroxyl groups of the aqueous resin (A1) is secured due to the fact that the range of the number-average molecular weight is a relatively high range of 10,000 to 80,000 and the acrylic emulsion has hydroxyl groups as many as shown by the above range, and thus the crosslinking density in a resulting coating film will fall within a better range.

The number-average molecular weight of the acrylic emulsion can be measured by gel permeation chromatography (GPC) using a polystyrene standard sample after removing moisture by reduced pressure drying or the like.

The aqueous resin (A1) may contain a polyester resin. Generally, the polyester resin that can be used as the aqueous resin (A1) can be prepared by condensing a polyhydric alcohol component and a polybasic acid component such that the requirement regarding a hydroxyl group and a carboxyl group will be satisfied.

Examples of the polyhydric alcohol component may include hydroxycarboxylic acid components such as ethylene glycol, diethylene glycol, propylene glycol, 1,3-propanediol, 1,4-butanediol, 1,5-pentanediol, 1,6-hexanediol, 2,2-diethyl-1,3-propanediol, neopentyl glycol, 1,9-nonanediol, 1,4-cyclohexanediol, neopentyl glycol hydroxypivalate ester, 2-butyl-2-ethyl-1,3-propanediol, 3-methyl-1,5-pentanediol, and 2,2,4-trimethylpentanediol.

Examples of the polybasic acid component may include polybasic acid components and anhydrides thereof such as aromatic polycarboxylic acids and anhydrides including phthalic anhydride, isophthalic acid, terephthalic acid, trimellitic anhydride, tetrachlorophthalic anhydride, and pyromellitic anhydride; alicyclic polycarboxylic acids and anhydrides thereof including hexahydrophthalic anhydride, tetrahydrophthalic anhydride, and 1,4- and 1,3-cyclohexanedicarboxylic acids; aliphatic polycarboxylic acids and anhydrides thereof including maleic anhydride, fumaric acid, succinic anhydride, adipic acid, and sebacic acid. A monobasic acid such as benzoic acid or tert-butylbenzoic acid may be used together, if necessary.

Moreover, monohydric alcohols, monoepoxide compounds such as CARDURA E (trade name, produced by Shell Chemical), and lactones (β-propiolactone, dimethylpropiolactone, butyrolactone, γ-valerolactone, ε-caprolactone, γ-caprolactone, etc.) may be used together as reaction components.

In addition to the above-mentioned components, fatty acids such as castor oil and dehydrated castor oil, and an oil component that is a mixture of one or two or more of such fatty acids may be added to the acid component and the alcohol component. Moreover, it is also possible to graft an acrylic resin or vinyl resin or to react a polyisocyanate compound as long as the requirement regarding a hydroxyl group and a carboxyl group is satisfied.

The thus-obtained polyester resin may preferably have a number-average molecular weight of 500 to 20,000, and more preferably 1,500 to 10,000. When the number-average molecular weight is less than 500, the storage stability may deteriorate in the case where the polyester resin is dispersed in water. When the number average molecular weight exceeds 20,000, the viscosity of the polyester resin increases, and therefore, the solid concentration decreases when the polyester resin is famed into a coating composition and coating workability may deteriorate.

The polyester resin may preferably have a glass transition point of −20 to 80° C. When the glass transition point is less than −20° C., the hardness of a resulting coating film may decrease, and when exceeding 80° C., the base hiding property may deteriorate. The glass transition point may more preferably be 0 to 60° C. The glass transition point of the polyester resin can be determined by calculation from the type and amount of the monomers used for the preparation of the polyester resin, as in the case of the acrylic resin. The glass transition point of the polyester resin may be measured with a differential scanning calorimeter (DSC).

The aqueous resin (A1) can be obtained by neutralizing the thus-obtained polyester resin with any of the basic compounds mentioned previously.

A content of the aqueous resin (A1) contained in the aqueous intermediate coating composition in the present invention may preferably be 30 to 80% by mass, more preferably 50 to 80% by mass based on the resin solid content of the aqueous intermediate coating composition.

For example, when the aqueous coating composition is used as an intermediate coating composition and a mixture of an acrylic resin and a polyester resin is used as the aqueous resin (A1), a ratio of the acrylic resin and the polyester resin may preferably be within a range of acrylic resin/polyester resin=7/1 to 0.5/1, and more preferably within a range of 6/1 to 1/1.

Polyisocyanate Compound (B)

The aqueous intermediate coating composition in the present invention contains two components, namely, the polyisocyanate compound (B) and the hydrophilicized-modified carbodiimide compound (C), as components for curing the aqueous resin (A1). Here, the polyisocyanate compound (B) may be water-dispersible or hydrophobic. Even when it is hydrophobic, water dispersibility is secured by the interaction with the hydrophilicized-modified carbodiimide compound (C) which is excellent in water dispersibility as described below.

Examples of the polyisocyanate compound (B) that is hydrophobic include polyisocyanate compounds such as aromatic diisocyanates including tolylene diisocyanate (TDI), 4,4'-diphenylmethane diisocyanate (MDI), xylylene diisocyanate (XDI), and metaxylylene diisocyanate (MXIDI); aliphatic diisocyanates including hexamethylene diisocyanate (HDI); alicyclic diisocyanates including isophorone diisocyanate (IPDI) and hydrogenated MDI; compounds resulting from such diisocyanate compounds by reducing their volatility and thereby converting them into less toxic forms; adducts of such diisocyanate compounds, including biurets, uretdiones, and isocyanurates; and relatively low-molecular-weight urethane prepolymers.

On the other hand, examples of the polyisocyanate compound (B) that is water-dispersible include products prepared by introducing a hydrophilic group into the polyisocyanate compounds mentioned above, and products prepared by mixing and emulsifying a surfactant and thereby self-emulsifying the polyisocyanate compounds.

Examples of the hydrophilic group include anionic groups such as a carboxyl group and a sulfonic acid group, cationic groups such as a tertiary amino group, and nonionic groups such as a polyoxyalkylene group. Among these, in consideration of the water resistance of a resulting coating film, the hydrophilic group may preferably be a nonionic group. As a specific nonionic group, a polyoxyethylene group having high hydrophilicity may be preferable.

Examples of the surfactant suitably used for the preparation of a self-emulsifiable polyisocyanate compound obtained by mixing and emulsifying the above-mentioned polyisocyanate compound and the surfactant include an anionic surfactant having an anionic group such as a carboxyl group or a sulfonic acid group, a cationic surfactant having a cationic group such as a tertiary amino group, and a nonionic surfactant having a nonionic group such as a polyoxyalkylene group. Among them, in consideration of the water resistance of a resulting coating film, it is more preferable to use a nonionic surfactant.

A commercially available product may be used as the polyisocyanate compound (B) that is water-dispersible. Examples of the commercially available products include Aquanate 100, Aquanate 110, Aquanate 200 and Aquanate 210 (produced by Tosoh CoLporation), Bayhydur TPLS-2032, SBU-Isocyanate L801, Bayhydur VPLS-2319, Bayhydur 3100, VPLS-2336 and VPLS-2150/1, Bayhydur 305, Bayhydur XP-2655 (produced by Sumika Bayer Urethane Co., Ltd.), Takenate WD-720, Takenate WD-725 and Takenate WD-220 (produced by Mitsui Chemicals, Inc.), and RESAMINE D-56 (produced by Dainichiseika Color & Chemicals Mfg. Co., Ltd.).

In the present invention, the polyisocyanate compound (B) to be used may more preferably be a polyisocyanate compound that is water-dispersible. The polyisocyanate compound (B) may be used singly, or two or more species thereof may be used in combination.

A content of the polyisocyanate compound (B) contained in the aqueous intermediate coating composition in the present invention may preferably be 5 to 55% by mass, more preferably 10 to 45% by mass based on the resin solid content of the aqueous intermediate coating composition.

Hydrophilicized-Modified Carbodiimide Compound (C)

The hydrophilicized-modified carbodiimide compound (C) contained in the aqueous intermediate coating composition in the present invention has, in its molecule, one or a plurality of structural units represented by

—OCONH—X—NHCOOY wherein X is a bifunctional organic group having at least one carbodiimide group, and Y is a structure resulting from elimination of a hydroxyl group from a polyalkylene glycol monoalkyl ether. It is considered that the inclusion of the structural unit offers both excellent dispersibility in water and excellent curability.

The hydrophilicized-modified carbodiimide compound (C) has three types, namely, a compound having one unit, a compound having two units, and a compound having three units of the structural unit shown above.

One example of the compound having two units of the structural unit shown above is a compound represented by the following formula (I).

[Chemical Formula 4]

YOCONH—X—NHCOO—Z—OCONH—X—NHCOOY  (I)

In the above formula (I), each X is a bifunctional organic group having at least one carbodiimide group, Y is each same or different structure resulting from elimination of a hydroxyl group from a polyalkylene glycol monoalkyl ether, and Z is a structure resulting from elimination of a hydroxyl group from a bifunctional polyol having a number-average molecular weight of 200 to 5,000.

Here, X can be represented by the following formula (a).

[Chemical Formula 5]

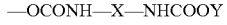

—$R^2$—(—N=C=N—$R^2$—)$_p$—  (a)

In the above formula (a), each $R^2$ may preferably be a hydrocarbon group having 6 to 15 carbon atoms. Specific examples of the hydrocarbon group may include a phenylene group, a diphenylenemethyl group, a diphenylene (dimethyl)methyl group, a methylphenylene group, a dimethylphenylene group, a tetramethylxylylene group, a hexylene group, a cyclohexylene group, and a dicyclohexylenemethyl group. Preferred may be a dicyclohexylenemethyl group. In the above formula, p is 1 to 10. p is the number of the carbodiimide groups existing in the above structural unit, and p may preferably be 2 or more in terms of curability, and the upper limit may preferably be 8 or less.

In the present description, repeat numbers, including the above p, are represented as average values.

The above Y can be represented by the following formula (b) or (c).

[Chemical Formula 6]

$R^3$—(—OCH$_2$—CHR$^4$—)$_q$—O—  (b)

$R^3$—(—OCHR$^4$—CH$_2$—)$_q$—O—  (c)

In the above formulas (b) and (c), $R^3$ may preferably be an alkyl group having 1 to 20 carbon atoms. Specific examples thereof include a methyl group, an ethyl group, a butyl group, a hexyl group, an octyl group, a decyl group, a dodecyl group, and a stearyl group. $R^4$ is a hydrogen atom or a methyl group, and may preferably be a hydrogen atom. q is a number from 4 to 40. In the above formulas (b) and (c), when $R^4$ is hydrogen, the formulas (b) and (c) represent the same structure.

The above Z is polymeric structure composed of an ether linkage, an ester linkage, or a carbonate linkage, and it is difficult to express Z by a general formula. In this regard, see the explanation for a bifunctional polyol having 200 to 5,000 that is described below.

A hydrophilicized-modified carbodiimide compound (C) having two units of the above structural unit can be obtained by reacting a raw material carbodiimide compound having at least two isocyanate groups in its molecule with a bifunctional polyol having hydroxyl groups at its molecular ends and having a number-average molecular weight of 200 to 5,000 in such a ratio that the molar amount of the isocyanate groups of the raw material carbodiimide compound is larger than the molar amount of the hydroxyl groups of the polyol, and then further reacting the thus-obtained reaction product with a polyalkylene glycol monoalkyl ether.

From the viewpoint of reactivity, the raw material carbodiimide compound having at least two isocyanate groups in its molecule may preferably have isocyanate groups at its both ends. A method for producing the raw material carbodiimide compound having isocyanate groups at its both ends is well known to those skilled in the art and, for example, a condensation reaction accompanied by a decarboxylation of an organic diisocyanate can be utilized.

As to the organic diisocyanate, specifically, aromatic diisocyanates, aliphatic diisocyanates, alicyclic diisocyanates, and mixtures thereof can be used, and specific examples thereof include 1,5-naphthylene diisocyanate, 4,4-diphenylmethane diisocyanate, 4,4-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylylene diisocyanate, isophorone diisocyanate, dicyclohexylmethane-4,4-diisocyanate, methylcyclohexane diisocyanate, and tetramethylxylylene diisocyanate. From the viewpoint of reactivity, dicyclohexylmethane-4,4-diisocyanate may be preferred.

For the condensation reaction, a carbodiimidization catalyst is usually used. Specific examples of the carbodiimidization catalyst include phospholene oxides such as 1-phenyl-2-phospholene-1-oxide, 3-methyl-2-phospholene-1-oxide, 1-ethyl-2-phospholene-1-oxide, 3-methyl-1-phenyl-2-phospholene-1-oxide, and 3-phospholene isomers thereof. From the viewpoint of reactivity, 3-methyl-1-phenyl-2-phospholene-1-oxide may be preferred.

While the number-average molecular weight of the bifunctional polyol having hydroxyl groups at its both molecule ends is not particularly limited, it may preferably be 200 to 5,000 from the viewpoint of reaction efficiency. Specific examples of the bifunctional polyol having hydroxyl groups at its both molecule ends may include polyether diols, polyester diols, and polycarbonate diols. For example, polyalkylene glycols such as polyethylene glycol, polypropylene glycol, polyethylene propylene glycol, polytetramethylene ether glycol, polyhexamethylene ether glycol, and polyoctamethylene ether glycol; polyester diols such as polyethylene adipate, polybutylene adipate, polyhexamethylene adipate, polyneopentyl adipate, poly-3-methylpentyl adipate, polyethylene/butylene adipate, and polyneopentyl/hexyl adipate; polylactone diols such as polycaprolactone diol and poly-3-methylvalerolactone diol; polycarbonate diols such as polyhexamethylenecarbonate diol, and mixtures thereof can be mentioned.

The reaction of the raw material carbodiimide compound having at least two isocyanate groups in its molecule with the bifunctional polyol having hydroxyl groups at its molecular ends and having a number-average molecular weight of 200 to 5,000 is performed by reacting them in such a ratio that the molar amount of the isocyanate groups of the raw material carbodiimide compound is larger than the molar amount of the hydroxyl groups of the polyol. When the molar amount of the isocyanate groups is smaller than or equal to the molar amount of the hydroxyl groups, a reaction together with a polyalkylene glycol monoalkyl ether described below cannot be performed sufficiently.

The ratio between the molar amount of the isocyanate groups of the raw material carbodiimide compound and the molar amount of the hydroxyl groups of the polyol having hydroxyl groups at its molecular ends may preferably be 1.1:1.0 to 2.0:1.0 from the viewpoint of reaction efficiency and economic efficiency. A degree of polymerization of the raw material carbodiimide compound and the bifunctional polyol having hydroxyl groups at its both molecular ends in a reaction product obtained via this step may preferably be 1 to 10 from the viewpoint of reaction efficiency.

By further reacting the thus-obtained reaction product with a polyalkylene glycol monoalkyl ether, a hydrophilicized-modified carbodiimide compound (C) having two units of the above structural unit can be obtained. As the polyalkylene glycol monoalkyl ether, a polyalkylene glycol monoalkyl ether represented by the following formula (b') or (c') is used.

[Chemical Formula 7]

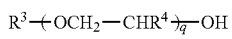 (b')

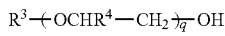 (c')

In the above formulas (b') and (c'), the contents described for $R^3$, $R^4$, and q in the preceding formulas (b) and (c) apply as they are. The type of $R^4$ and q in the above unit are set appropriately within the above ranges, respectively, in consideration of storage stability, dispersibility in water, and reactivity after volatilization of water. It may be preferable from the viewpoint of dispersibility in water that $R^3$ in the monoalkoxypolyalkylene glycol be a methyl group and $R^4$ be a hydrogen atom. Moreover, from the viewpoint of dispersibility in water and reactivity after volatilization of water, the q may preferably be 4 to 20, and more preferably 6 to 12.

As the polyalkylene glycol monoalkyl ether, a polyalkylene glycol monoalkyl ether having a number-average molecular weight of 200 to 5,000 may preferably be used. The alkyl group of the polyalkylene glycol monoalkyl ether may preferably be an alkyl group having 1 to 20 carbon atoms. Specific examples of the polyalkylene glycol monoalkyl ether include those composed of polyethylene glycol, polypropylene glycol, or mixtures thereof each of which is capped at one end with an alkyl group having 1 to 20 carbon atoms. More detailed specific examples of such a polyalkylene glycol monoalkyl ether include polyethylene glycol monomethyl ether, polyethylene glycol mono-2-ethylhexyl ether, polyethylene glycol monolauryl ether, polypropylene glycol monomethyl ether, polypropylene glycol mono-2-ethylhexyl ether, and polypropylene glycol monolauryl ether, each having a number-average molecular weight of 200 to 5,000.

The reaction product and the polyalkylene glycol monoalkyl ether are reacted in such a ratio that the molar amount of the isocyanate groups of the reaction product is equal to or larger than the molar amount of the hydroxyl groups of the polyalkylene glycol monoalkyl ether. When the molar amount of the isocyanate groups is smaller than the molar amount of the hydroxyl groups, the reaction of the polyalkylene glycol monoalkyl ether with the reaction product cannot be carried out sufficiently. The molar amount of the isocyanate groups of the reaction product can be measured directly, and a value calculated from the charging formulation may be adopted.

In the reaction of the raw material carbodiimide compound with the bifunctional polyol having hydroxyl groups at its molecular ends and the reaction of the reaction product with the polyalkylene glycol monoalkyl ether, a catalyst may be used. The temperature during the reactions is not particularly limited, and from the viewpoint of control of the reaction system and reaction efficiency, the temperature may preferably be 60 to 120° C. In addition, an organic solvent free from active hydrogen may preferably be used in the reactions.

Such a two-step reaction can provide a hydrophilicized-modified carbodiimide compound (C) having two units of the above structural unit. The thus-produced hydrophilicized-modified carbodiimide compound (C) does not have only the structure of the formula (I) provided above, but is a mixture containing other various reaction products derived from the raw materials used. Generally, however, it may be considered to have the structure of the above formula (I).

One example of the hydrophilicized-modified carbodiimide compound (C) having three units of the above structural unit is a compound represented by the following formula (II).

[Chemical Formula 8]

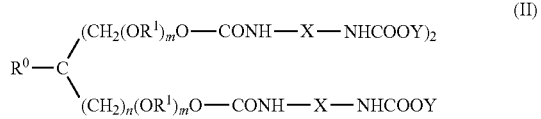

In the above formula (II), for X and Y, the description for X and Y made for the preceding one having two units of the above structural unit can apply as it is. $R^0$ is hydrogen, a methyl group, or an ethyl group. Each $R^1$ is an alkylene group having 4 or less carbon atoms, and may be either same or different. Specific alkylene groups include a methylene group, an ethylene group, a propylene group, and a butylene group. n is 0 or 1, and m is a number from 0 to 60.

$R^0$, $R^1$, n and m are determined depending on a trifunctional polyol to be used for the production of the hydrophilicized-modified carbodiimide compound (C).

When m is 11 or more, the ratio of a hydrophilic section to a hydrophobic section may preferably be 2.0 to 6.3. The ratio of the hydrophilic section to the hydrophobic section can be determined by dividing the molecular weight of the moiety of an oxymethylene group or an oxyethylene group existing in the carbodiimide compound by the molecular weight of the carbodiimide compound.

The hydrophilicized-modified carbodiimide compound (C) having three units of the above structural unit can be obtained by reacting a raw material carbodiimide compound having at least two isocyanate group in one molecule with a polyalkylene glycol monoalkyl ether in such a ratio that the equivalent of the isocyanate groups of the raw material carbodiimide compound is larger than the equivalent of the hydroxyl groups of the polyalkylene glycol monoalkyl ether, and further reacting the resulting reaction product with a trifunctional polyol.

For the raw material carbodiimide compound having at least two isocyanate group in one molecule, the description made for the raw material carbodiimide compound of the hydrophilicized-modified carbodiimide compound (C) having two units of the above structural unit applies as it is.

The reaction of the raw material carbodiimide compound with the polyalkylene glycol monoalkyl ether is required to make isocyanate groups remain in order to further react with a trifunctional polyol after the reaction. For this reason, it is necessary in the above reaction that the equivalent of the isocyanate groups is larger than the equivalent of the hydroxyl groups, and it may be preferred that the equivalent ratio of the isocyanate groups to the hydroxyl groups be 2/1. The reaction can usually be carried out under conditions well known to those skilled in the art, and a tin-based catalyst may be used, if necessary.

For the polyalkylene glycol monoalkyl ether, the description made for the polyalkylene glycol monoalkyl ether of the hydrophilicized-modified carbodiimide compound (C) having two units of the above structural unit applies as it is.

Next, the thus-obtained reaction product is reacted with a trifunctional polyol. The amount of the trifunctional polyol to be used for the reaction may preferably be such an amount that the hydroxyl group equivalent is equal to or larger than the isocyanate equivalent in the reaction product, and more preferably, the isocyanate equivalent is equal to the hydroxyl group equivalent. The isocyanate equivalent in the reaction product not only can be measured directly but also can be determined by calculation from the blending ratio of the diisocyanate compound and the polyalkylene glycol monoalkyl ether in the preceding step. The reaction can be carried out in the same manner as the reaction of the raw material carbodiimide compound with the polyalkylene glycol monoalkyl ether described previously.

The trifunctional polyol may preferably be trimethylolpropane, glycerol, or an alkylene oxide adduct of these because of its easy availability. Examples of the alkylene oxide include ethylene oxide and propylene oxide. An alkylene oxide adduct of glycerol is commercially available from Sanyo Chemical Industries, Ltd. as GP Series. In consideration of the curing reactivity of a three-chain type hydrophilic carbodiimide compound to be obtained, one is particularly preferred in which alkylene oxide has been added to every hydroxyl group. Of the aforementioned GP Series, GP-250 and GP-3000 are mentioned as those having such a structure.

Such a two-step reaction can provide a hydrophilicized-modified carbodiimide compound (C) having three units of the above structural unit. The thus-produced hydrophilicized-modified carbodiimide compound (C) does not have only the structure of the formula (II) described above, but it may be considered to have the structure of the above formula (II).

One example of the hydrophilicized-modified carbodiimide compound (C) having one unit of the above structural unit is a compound represented by the following formula (III),

[Chemical Formula 9]

wherein X is a bifunctional organic group having at least one carbodiimide group, and Y is each same or different structure resulting from elimination of a hydroxyl group from a polyalkylene glycol monoalkyl ether.

X in the formula (III) is a group that can be represented by formula (a) in the above formula (I).

Y in the formula (III) is a structure resulting from elimination of hydroxyl groups from same or different polyethylene glycol monoalkyl ethers. The Y can represent the same structure of the Y in the above-described formula (I). Use of the hydrophilicized-modified carbodiimide compound (C) represented by the formula (III) offers an advantage that a crosslinking density can be held at a higher level. Conceivable reasons for this are that in the formulas (I) and (II) in which there are a plurality of carbodiimide units, the efficiency of the reaction with an acid is low under a low acid value of an aqueous resin and that the crosslinking of the hydroxyl groups of the aqueous resin and the isocyanate is not disturbed because the formula (III) does not have a bulky structure unlike the formulas (I) and (II). Accordingly, it is considered that the crosslinking density of the hydrophilicized-modified carbodiimide compound (C) represented by the formula (III) becomes high for these reasons.

The Y in the formula (III) may preferably be same or different structure selected from the following (i) or (ii):
(i) a structure resulting from elimination of a hydroxyl group from a polyethylene glycol monoalkyl ether in which an alkyl group having 1 to 3 carbon atoms is ether-linked to an end of a polyethylene oxide unit having a repeat number of 6 to 20,
(ii) a structure resulting from elimination of a hydroxyl group from a polypropylene glycol monoalkyl ether in which an alkyl group having 1 to 8 carbon atoms is ether-linked to an end of a polypropylene oxide unit having a repeat number of 4 to 60.

More preferably, the repeat number of the polypropylene oxide units of the above (ii) is 15 to 60.

Use of the hydrophilicized-modified carbodiimide compound (C) represented by the formula (III) and having the above (i) and (ii) offers an advantage that excellent dispersibility in water is attained and stability is improved and crosslinking density is held at a higher level.

The hydrophilicized-modified carbodiimide compound (C) represented by the formula (III) can be prepared by reacting same or different polyalkylene glycol monoalkyl ethers with the raw material carbodiimide compound obtained through the above-described condensation reaction accompanied by decarbonization of an organic diisocyanate.

The polyalkylene glycol monoalkyl ether may more preferably be a polyethylene glycol monoalkyl ether in which an alkyl group having 1 to 3 carbon atoms is ether-linked to an end of a polyethylene oxide unit having a repeat number of 6 to 20, or a polypropylene glycol monoalkyl ether in which an alkyl group having 1 to 8 carbon atoms is ether-linked to an end of a polypropylene oxide unit having a repeat number of 4 to 60. In the preparation of the hydrophilicized-modified carbodiimide compound (C) represented by the formula (III), such a polyethylene glycol monoalkyl ether and such a polypropylene glycol monoalkyl ether may be used either singly or in combination.

Specific examples of the polyethylene glycol monoalkyl ether include polyethylene glycol monomethyl ether, polyethylene glycol monoethyl ether, and polyethylene glycol monopropyl ether, and especially, polyethylene glycol monomethyl ether is suitable.

Specific examples of the polypropylene glycol monoalkyl ether include polypropylene glycol monomethyl ether, polypropylene glycol monoethyl ether, polypropylene glycol monobutyl ether, and polypropylene glycol 2-ethylhexyl ether, and especially, polypropylene glycol monobutyl ether is suitable.

In the hydrophilicized-modified carbodiimide compound (C) represented by the above formula (III), it may be preferable that one Y is (i) and the other Y is (ii), and the ratio of (i) a structure resulting from elimination of a hydroxyl group from a polyethylene glycol monoalkyl ether in which an alkyl group having 1 to 3 carbon atoms is ether-linked to an end of a polyethylene oxide unit having a repeat number of 6 to 20 and (ii) a structure resulting from elimination of a hydroxyl group from a polypropylene glycol monoalkyl ether in which an alkyl group having 1 to 8 carbon atoms is ether-linked to an end of a polypropylene oxide unit having a repeat number of 4 to 60 is within a range of (i):(ii)=1:0.7 to 1:8.

In the hydrophilicized-modified carbodiimide compound (C) represented by the formula (III), it may be preferable that the surrounding of the carbodiimide group is hydrophobic to a certain degree in order to enhance water resistance when a coating film is formed. Moreover, in order to suppress the deactivation of carbodiimide by water and to keep stability, it may be preferable that the surrounding of the carbodiimide group is hydrophobic to a certain degree and the contact with water molecules is kept low. On the other hand, in the hydrophilicized-modified carbodiimide compound (C) represented by the formula (III), the compound is required to have a polyethylene glycol structure in a certain amount in order to maintain hydrophilicity. When the above structures (i) and (ii) are present in a ratio within the range of (i):(ii)=1:0.7 to 1:8, the hydrophobicity can be kept at a certain degree at the surrounding of the carbodiimide group, while the hydrophilicity of the carbodiimide compound is secured. This offers an advantage that an aqueous intermediate coating composition superior in low-temperature curability and also superior in coating material stability can be obtained. The ratio (i):(ii) may more preferably be within the range of (i):(ii)=1:0.7 to 1:1.5.

A content of the hydrophilicized-modified carbodiimide compound (C) contained in the aqueous intermediate coating composition is preferably 1 to 8% by mass based on the resin solid content of the aqueous intermediate coating composition The fact that the amount of the hydrophilicized-modified carbodiimide compound (C) is within the above range offers an advantage that good water resistance and good water-resistant shrinkage can be obtained in a resulting multilayer coating film.

Preparation, etc. of Aqueous Intermediate Coating Composition

The aqueous intermediate coating composition of the present invention comprises an aqueous resin having a hydroxyl group and a carboxyl group (A1), a polyisocyanate compound (B), and a hydrophilicized-modified carbodiimide compound (C).

In the above aqueous intermediate coating composition, a ratio of the equivalent of the carbodiimide group included in the hydrophilicized-modified carbodiimide compound (C) to the equivalent of the isocyanate group included in the polyisocyanate compound (B) may preferably be within the range of 0.01 to 0.20. Thus, in the present invention is characterized in that the equivalent of the carbodiimide group is very small based on the equivalent of the isocyanate group. In the above aqueous intermediate coating composition, the fact that the ratio of the equivalent of the carbodiimide group to the equivalent of the isocyanate group is within the range of 0.01 to 0.20 offers an advantage that the crosslinking density of a resulting coating film is increased while the low-temperature curability is secured and good coating film properties are secured. The equivalent ratio may more preferably be in the range of 0.01 to 0.09.

The aqueous resin having a hydroxyl group and a carboxyl group (A1) to be used in the present invention has a hydroxyl value of 80 to 200 mgKOH/g and an acid value of 10 to 40 mgKOH/g in terms of resin solid content as described above. That is, it is characterized in that the hydroxyl value is much greater than the acid value. The fact that the ratio of the equivalent of the carbodiimide group included in the hydrophilicized-modified carbodiimide compound (C) to the equivalent of the isocyanate group included in the polyisocyanate compound (B) is within the range of 0.01 to 0.20 in addition to the use of such an aqueous resin (A1) offers an advantage that a coating film having a sufficient crosslinking density can be obtained while securing coating material stability. For example, when the ratio of the equivalent of the carbodiimide group included in the hydrophilicized-modified carbodiimide compound (C) to the equivalent of the isocyanate group included in the polyisocyanate compound (B) is merely reduced without using the aqueous resin (A1) described above, coating material stability may be greatly reduced. This is because the stability of the polyisocyanate compound (B) in the coating composition is improved due to the existence of the hydrophilicized-modified carbodiimide compound (C) in the aqueous intermediate coating composition.

The present invention is characterized by using an aqueous resin (A1) having a hydroxyl value greatly higher than an acid value. Due to the fact that the aqueous resin (A1) has such a high hydroxyl value, a high crosslinking density will be achieved in a resulting coating film. In addition, due to the fact that the acid value of the aqueous resin (A1) is low, an undesirable side reaction which may occur between an acid group of the aqueous resin (A1) and an isocyanate group of the polyisocyanate compound (B) will be suppressed. Moreover, the fact that the ratio of the equivalent of the carbodiimide group included in the hydrophilicized-modified carbodiimide compound (C) to the equivalent of the isocyanate group included in the polyisocyanate compound (B) is within the range of 0.01 to 0.20 and the fact that the amount of the carbodiimide group is extremely small offer an advantage that a sufficient crosslinking density is achieved even after storage of a coating composition.

In the aqueous intermediate coating composition, the ratio of the equivalent of the isocyanate group included in the polyisocyanate compound (B) to the equivalent of the hydroxyl group contained in the aqueous resin (A1) may preferably be within the range of 0.6 to 1.5. The hydroxyl group of the aqueous resin (A1) and the isocyanate group of the polyisocyanate compound (B) are groups which react with each other. The fact that the equivalent ratio of these groups is within the above-mentioned range offers an advantage that a curing reaction proceeds satisfactorily even at a low temperature and, and thus, a coating film having a desirable crosslinking density can be obtained.

In the aqueous intermediate coating composition, the ratio of the equivalent of the carbodiimide group included in the hydrophilicized-modified carbodiimide compound (C) to the equivalent of the acid group included in the aqueous resin (A1) may preferably be within the range of 0.1 to 1.0. The equivalent ratio may more preferably be within the range of 0.1 to 0.6. In this case, with respect to the equivalents of the carbodiimide group and the acid group which react with each other, the acid group is present in an excess amount. This provides a state where basically no carbodiimide groups remain in a cured coating film to be famed and will allow acid groups to remain, and thus offers an advantage that coating film adhesion to an object to be coated is improved.

If necessary, the aqueous intermediate coating composition may contain, in addition to the above-mentioned components (A1) to (C), a pigment, a curing catalyst, a surface conditioner, an antifoaming agent, a pigment dispersing agent, a plasticizer, a film-forming assistant, an ultraviolet absorber, an antioxidant, solvent (water, organic solvents), etc. Since the aqueous intermediate coating composition is excellent in reactivity at low temperatures, it may preferably be produced at a coating site. The aqueous intermediate coating composition can be obtained by mixing the components (A1) to (C).

In the aqueous intermediate coating composition, the hydrophilicized-modified carbodiimide compound (C) is excellent in water dispersibility, so that it is possible to improve the storage stability of the aqueous intermediate coating composition by forming the above-mentioned curing agent composition even when the dispersibility in water of the polyisocyanate compound (B) is not sufficient.

Generally, the resin solid concentration of the aqueous intermediate coating composition may preferably be set to 15 to 60% by mass though it varies depending on the application condition.

Aqueous Base Coating Composition

The aqueous base coating composition to be used in the present invention comprises an aqueous resin having a hydroxyl group and a carboxyl group (A2), a melamine resin (D), a weak acid catalyst (E), and an aqueous polyurethane resin (F).

Aqueous Resin Having a Hydroxyl Group and a Carboxyl Group (A2)

The aqueous resin (A2) contained in the aqueous base coating composition is the same type of resin as the above-mentioned aqueous resin (A1) contained in the aqueous intermediate coating composition, but is a resin without the provision regarding the range of the acid value in the aqueous resin (A1). That is, the aqueous resin (A2) contained in the aqueous base coating composition is a resin having a hydroxyl value of 80 to 200 mgKOH/g in terms of resin solid content. The aqueous resin (A2) contained in the aqueous base coating composition may preferably have an acid value of 10 to 40 mgKOH/g.

The fact that the aqueous resin (A2) contained in the aqueous base coating composition has a hydroxyl value of 80 to 200 mgKOH/g in terms of resin solid content offers an advantage that the crosslinking density of a resulting coating film falls into a good range while keeping the coating material stability good in the aqueous base coating composition containing the above-mentioned components, so that the performance such as water resistance is improved. This is considered to be because the low-temperature curability of the coating composition is secured due to the fact that the hydroxyl value of the aqueous resin (A2) is relatively high like the above-mentioned range and the melamine resin (D) described below, the weak acid catalyst (E), and the aqueous polyurethane resin (F) are further contained in the aqueous base coating composition, and thus the crosslinking density in a resulting coating film will fall within a good range.

The aqueous resin (A2) may preferably be contained within the range of 20 to 60% by mass based on the resin solid content of the aqueous base coating composition, for example. The above range may more preferably be from 30 to 50 mass %.

Melamine Resin (D)

The melamine resin (D) contained in the aqueous base coating composition of the present invention is has a structure in which $R^5$ to $R^{10}$ groups are bonded to a melamine nucleus (triazine nucleus) via three nitrogen atoms, as represented in the following formula (1). The melamine resin is generally composed of a polynuclear body in which a plurality of melamine nuclei are bonded to each other. On the other hand, the melamine resin may have a mononuclear body which is composed of one melamine nucleus. Furthermore, a structure of melamine nucleus constituting the melamine resin may preferably be represented by the following formula (1).

[Chemical Formula 10]

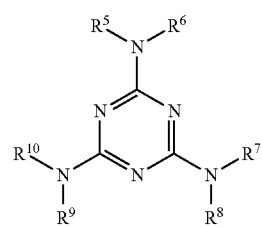

formula (1)

In the above formula (1), each $R^5$ to $R^{10}$ is same or different, and represents a hydrogen atom (imino group), $CH_2OH$ (methylol group), $CH_2OR^{11}$, or a bonding portion with another melamine nucleus. $R^{11}$ is an alkyl group, preferably an alkyl group having 1 to 4 carbon atoms such as a methyl group, an ethyl group, a propyl group, a butyl group or the like.

In the present invention, the melamine resin has an average imino group amount of 1.0 or more and an average methylol group amount of 0.5 or more, per one melamine nucleus. That is, all of $R^5$ to $R^{10}$ include an average of 1.0 or more imino group(s), and include an average of 0.5 or more methylol group(s). Such a melamine resin is an iminomethylol type melamine resin derivative having both of an imino group and a methylol group in one molecule. The melamine resin can be self-condensed by the imino group. The methylol group can react with a hydroxyl group of the aqueous resin to cause co-condensation. A crosslinked structure is formed by a reaction of the melamine resin with the aqueous resin (A2), and a coating film having good physical properties and quality can be obtained.

In the present invention, by setting amounts (average values) of imino group and methylol group per one melamine nucleus within the above specified range, both low temperature curability and storage stability can be improved. A preferable lower limit value of the average imino group amount may be 1.2. An upper limit value of the average imino group amount is not particularly limited, but from the viewpoint of production, the preferable upper limit value may be 3.0. A preferable lower limit value of the average methylol group amount may be 0.65, and a more preferable lower limit value may be 0.7. An upper limit value of the average amount of methylol groups is not particularly limited, but from the viewpoint of production, the preferable upper limit value may be 1.0.

A number average molecular weight measured by GPC in the melamine resin may preferably be 300 to 1,300. When the number average molecular weight is within the above range, film appearance, alkali resistance and water resistance of the coating film can be improved. A more preferable range of the number average molecular weight may be 300 to 1,000, and a particularly preferable range may be 300 to 800.

The above-mentioned melamine resin can be synthesized by adjusting the average imino group amount and average methylol group amount per one melamine nucleus so as to have a high value as described above by a manufacturing method commonly used by those skilled in the art. As the melamine resin, a commercially available product may be used. Specific examples of commercially available products include "CYMSL (registered trademark) 701", "CYMEL 202" manufactured by ALLNEX Japan Corporation. In the examples described below, in addition to these commercially available products, those prepared so that the average imino group amount and the average methylol group amount are higher than these are used. The above melamine resins may be used alone, or two or more of them may be used in combination.

Weak Acid Catalyst (E)

The weak acid catalyst (E) may be an acid having a relatively low degree of ionization in an aqueous solution. For example, an acid catalyst having pKa ($H_2O$) of more than 1 may be suitable. pKa ($H_2O$) is an acid dissociation constant for water, and a generally known value at 20° C. may be used. Examples of such weak acid catalysts include carboxylic acids such as acetic acid, propionic acid and benzoic acid; and, phosphoric acid, phosphoric acid esters, phenol, carbonic acid, boric acid, hydrogen sulfide and the like. As the weak acid catalyst (E), any one of these may be used, or two or more of them may be used in combination. It may be particularly preferable that the weak acid catalyst (E) contains a phosphate compound. By using a weak acid catalyst, storage stability can be secured while improving low temperature curability.

As the weak acid catalyst (E), a commercially available acid catalyst can be used. An example of the commercially available products may include, for example, CYCAT series, those having pKa ($H_2O$) of more than 1.

The aqueous coating composition does not substantially include an acid catalyst having pKa ($H_2O$) of 1 or less. The team "substantially" means that an amount of the acid catalyst having pKa ($H_2O$) of 1 or less based on the aqueous coating composition does not exceed 0.01% by mass. If the acid catalyst having pKa ($H_2O$) of 1 or less is contained beyond the above concentration, the effect of low temperature curing cannot be obtained.

Aqueous Polyurethane Resin (F)

The aqueous base coating composition comprises an aqueous polyurethane resin (F) in addition to the above components. Due to the inclusion of the specific aqueous polyurethane resin (F) in the aqueous base coating composition, even in the case where the aqueous intermediate coating composition and the aqueous base coating composition are applied and then the aqueous coating composition is baked and cured under low-temperature curing conditions, it is possible to form a strong coating film through fusion of the aqueous polyurethane resin with itself and other components, and thus, a multilayer coating film excellent in adhesion between coating films and water-resistant adhesion is to be obtained.

The aqueous polyurethane resin (F) is a polymer obtained by using a polyol compound (F-1), a compound having an active hydrogen group and a hydrophilic group in the molecule (F-2), an organic polyisocyanate (F-3), and, if necessary, a chain extender and a polymerization terminator, and can be prepared by dissolving or dispersing a resulting polymer in water.

The polyol compound (F-1) is not particularly limited as long as it is a polyol compound having two or more hydroxyl groups. Examples of the polyol compound (F-1) include polyhydric alcohols such as ethylene glycol, propylene glycol, 1,4-butanediol, 1,6-hexanediol, trimethylolpropane, and glycerol; polyether polyols such as polyethylene glycol, polypropylene glycol, and polytetramethylene ether glycol; polyester polyols obtained from a dicarboxylic acid such as adipic acid, sebacic acid, itaconic acid, maleic anhydride, phthalic acid, and isophthalic acid, and a glycol such as ethylene glycol, triethylene glycol, propylene glycol, butylene glycol, tripropylene glycol, and neopentyl glycol; polycaprolactone polyol; polybutadiene polyol; polycarbonate polyol; and polythioether polyol. The polyol compound (F-1) may be used singly, or two or more species thereof may be used in combination. The polyol compound (F-1) may preferably have a number-average molecular weight of 500 to 5000.

Examples of the compound having an active hydrogen group and a hydrophilic group in the molecule (F-2) include compounds known as compounds containing active hydrogen and an anionic group {an anionic group or an anion-forming group (a group that reacts with a base to form an anionic group and, in this case, that is converted into an anionic group by neutralizing with a base before, during or after a urethanization reaction)} (those disclosed in JP-B-42-24192 and JP-B-55-41607; specific examples include dimethylolalkanoic acids such as α,α-dimethylolpropionic acid, α,α-dimethylolbutyric acid, and dimethylolacetic acid), compounds known as compounds having active hydrogen and a cationic group in the molecule (e.g., those disclosed in JP-B-43-9076), and compounds known as compounds having active hydrogen and a nonionic group (e.g., those disclosed in JP-B-48-41718; specifically, polyethylene glycol and alkylalcohol alkylene oxide adducts, etc.). It may be preferred to use a dimethylolalkanoic acid as the compound having an active hydrogen group and a hydrophilic group in the molecule (F-2).

The organic polyisocyanate (F-3) is not particularly limited as long as it has two or more isocyanate groups in the molecule. Specific examples of the organic polyisocyanate (F-3) include:

aliphatic diisocyanates having 2 to 12 carbon atoms such as hexamethylene diisocyanate, 2,2,4-trimethylhexane diisocyanate, and lysine diisocyanate;

alicyclic diisocyanates having 4 to 18 carbon atoms such as 1,4-cyclohexane diisocyanate, isophorone diisocyanate, 4,4'-dicyclohexylmethane diisocyanate, methylcyclohexylene diisocyanate, and isopropylidenecyclohexyl-4,4'-diisocyanate;

aromatic diisocyanates such as 2,4-toluylene diisocyanate, 2,6-toluylene diisocyanate, diphenylmethane-4,4'-diisocyanate, 1,5'-naphthene diisocyanate, tolidine diisocyanate, diphenylmethylmethane diisocyanate, tetraalkyldiphenylmethane diisocyanate, xylylene diisocyanate, tetramethylxylylene diisocyanate, 4,4'-dibenzyl diisocyanate, and 1,3-phenylene diisocyanate; and triisocyanates such as lysine ester triisocyanate, triphenylmethane triisocyanate, 1,6,11-undecane triisocyanate, 1,8-diisocyanate-4,4-isocyanatemethyloctane, 1,3,6-hexamethylene triisocyanate, and bicycloheptane triisocyanate.

These polyisocyanates may be used in the form of dimer or trimer thereof (isocyanurate linkage), and may be reacted with an amine and used as a biuret. Moreover, it is also possible to use polyisocyanates having a urethane linkage resulting from reaction of such polyisocyanate compounds with polyols.

It may be more preferred to use an aliphatic diisocyanate as the organic polyisocyanate (F-3). Preparation of the aqueous polyurethane resin (F) using an aliphatic diisocyanate offers an advantage that the water permeability of a resulting coating film can be adjusted to a proper range and good low-temperature initial water resistance can be obtained.

The chain extender that can be used if necessary in the preparation of the aqueous polyurethane resin (F) is not particularly limited as long as it has two or more active hydrogen groups, and examples thereof include low molecular weight polyols (number-average molecular weight of less than 500) and polyamines. Examples of the low molecular weight polyols include ethylene glycol, propylene glycol, 1,4-butanediol, 3-methylpentanediol, 2-ethyl-1,3-hexanediol, and trimethylolpropane. Examples of the polyamines include ethylenediamine, hexamethylenediamine, diethylenetriamine, hydrazine, xylylenediamine, and isophoronediamine.

Examples of the polymerization terminator include a compound having one active hydrogen in its molecule, and a monoisocyanate compound.

Examples of the compound having one active hydrogen in its molecule include monoalcohols (e.g., alkyl alcohols such as methanol, butanol and octanol, alkyl alcohol alkylene oxide adducts), and monoamines (e.g., alkylamines such as butylamine and dibutylamine).

Examples of the monoisocyanate compound include methylisocyanate, ethylisocyanate, propylisocyanate, butylisocyanate, laurylisocyanate, cyclohexylisocyanate, phenylisocyanate, and tolyleneisocyanate.

A reaction method in producing the aqueous polyurethane resin (F) may be any method of a one-shot method in which the respective components are reacted at once and a multistage method in which the respective components are reacted in steps {a method of producing the resin by reacting part of an active hydrogen-containing compound (e.g., macromolecular polyol) with a polyisocyanate, thereby forming an NCO terminated prepolymer, and then reacting the remainder of the active hydrogen-containing compound}. The reaction of synthesizing the aqueous polyurethane resin (F) is performed usually at 40 to 140° C., preferably 60 to 120° C. In order to accelerate the reaction, there may be used a catalyst that is usually used for a urethanization reaction, such as a tin-based catalyst including dibutyltin laurate and tin octylate or an amine-based catalyst including triethylenediamine. In addition, the above reaction may be carried out in an organic solvent that is inert to isocyanate (e.g., acetone, toluene, dimethylformamide, etc.), and the solvent may be added either during the reaction or after the reaction.

The aqueous polyurethane resin (F) in the present invention can be prepared by treating a resulting polymer with a known method (a method of forming an anionic group by neutralization with a base in the case of an anion-forming group, a method of forming a cationic group with a quaternarizing agent or a method of forming a cationic group by neutralization with an acid in the case of a cation-forming group) and then dispersing the polymer in water.

The step of dissolving the polymer in water is not particularly limited, and it may be performed either after the reaction or at a stage during the course of the multistage method. For example, when dissolving the polymer in water at the stage of an NCO terminated prepolymer, the aqueous polyurethane resin (F) is obtained by dissolving the polymer in water while extending the chain with water and/or a polyamine.

When using an organic solvent inert to the isocyanate, solvent removal may be carried out after dissolving the polymer in water.

The aqueous polyurethane resin (F) in the present invention is required to have a glass transition point (Tg) of −50° C. or less and a cured film of the aqueous polyurethane resin (F) is required to have an elongation at break of 400% or more at −20° C.

When the glass transition point (Tg) of the aqueous polyurethane resin (F) exceeds −50° C., a resulting multilayer coating film will be poor in coating film adhesion, chipping resistance and water resistance. The glass transition point (Tg) may more preferably be −55° C. or less, and even more preferably −58° C. or less. The glass transition point (Tg) of the aqueous polyurethane resin (F) can be measured using a differential scanning calorimeter.

When the cured film of the aqueous polyurethane resin (F) has an elongation at break of less than 400% at −20° C., a resulting multilayer coating film will be poor in coating film adhesion, chipping resistance and water resistance. The elongation at break may more preferably be 500% or more.

The elongation at break of the cured film of the aqueous polyurethane resin (F) can be determined in accordance with JIS K7127.

Specifically, 95 parts by mass (resin solid content amount) of the aqueous polyurethane resin (F) and 5 parts by mass (resin solid content amount) of the hydrophilicized-modified carbodiimide compound (C) are mixed. The resulting mixture is applied uniformly with a doctor blade such that the dry film thickness is 20 μm. After leaving at rest at 20° C.

for 10 minutes, the resulting mixture is preheated at 80° C. for 3 minutes, thereby volatilizing water. Then, the resulting mixture is baked at 120° C. for 30 minutes, and thus a cured film is prepared. The resulting cured film is subjected to a tensile performance test at a testing temperature of −20° C. in accordance with JIS K7127 and an elongation ratio at the time of breaking is measured. The obtained elongation ratio is taken as an elongation at break.

By mixing the aqueous polyurethane resin and the carbodiimide compound represented by the formula (I), (II) or (III) and baking them to be formed into a film shape as described above, crosslinking and/or fusion between the aqueous polyurethane resin and the carbodiimide resin proceeds, and it becomes possible to evaluate the elongation at break of the aqueous polyurethane resin.

As the aqueous polyurethane resin (F), a commercially available product may be used. Examples of the commercially available product include Neo Rez Series, which are aqueous polyurethane resins available from Kusumoto Chemicals, Ltd., HUX Series, which are aqueous polyurethane resins available from ADEKA Corporation, and UCOAT Series, PERMARIN Series, and U-Prene Series, which are aqueous polyurethane resins available from Sanyo Chemical Industries, Ltd.

A content of the aqueous polyurethane resin (F) may preferably be 8% by mass or more, more preferably 10% by mass or more, and more preferably 15% by mass or more based on the resin solid content of the aqueous base coating composition. The fact that the content of the aqueous polyurethane resin (F) is 8% by mass or more offers an advantage that even in the case where the aqueous coating composition is baked and cured under low-temperature curing conditions, it is possible to form a strong coating film through fusion of the aqueous polyurethane resin with itself and other components, and thus, a multilayer coating film excellent in adhesion between coating films and water-resistant adhesion is to be obtained. The upper limit of the content may preferably be 50% by mass or less, and more preferably 30% by mass or less.

Other Resins

The aqueous base coating composition may contain a resin component other than the aqueous resin (A2) (other resin), if necessary. One example of such other resin includes a resin that is prepared in the same manner as the aqueous resin (A2) and that has a hydroxyl value of less than 80 mgKOH/g. Examples of such other resin include resins having a hydroxyl group, such as polyether diol and polycarbonate diol.

Such other resin can be used in an arbitrary amount, provided that functions (water resistance, chipping resistance, etc.) of the aqueous base coating composition are not damaged. The resin having a hydroxyl value of less than 80 mgKOH/g may preferably be contained, for example, in the range of 15 to 45% by mass based on the resin solid content of the aqueous base coating composition.

Preparation of Aqueous Base Coating Composition

In the aqueous base coating composition, a mass ratio of the aqueous resin (A2) and the melamine resin (D) is in the range of (A2)/(D)=0.7 to 3 in terms of solid content. When an amount of the aqueous resin (A2) exceeds the above range and an amount of the melamine resin (D) is less than the above range, curing (crosslinking) reactivity may be affected and low temperature curability may not be sufficient. On the other hand, when an amount of the aqueous resin (A2) is decreased and an amount of the melamine resin (D) is increased, an amount of acid group in the aqueous base coating composition increases, so that curing (crosslinking) reactivity in storage may be increased and storage stability may be deteriorated. Preferably, the mass ratio of the aqueous resin (A2) to the melamine resin (D) may preferably be in the range of (A2)/(D)=0.7 to 2.7 in terms of solid content, more preferably within the range of 0.8 to 2.7.

An amount of the weak acid catalyst (E) in the aqueous base coating composition is within the range of 0.1 to 10.0 parts by mass, based on 100 parts by mass of solid contents ((A2)+(D)) of the aqueous resin (A2) and the melamine resin (D) contained in the aqueous base coating composition. In the case of using a weak acid catalyst dissolved or dispersed in a solvent, an amount of the weak acid catalyst (E) is calculated based on an amount of the active ingredient excluding the solvent (volatile component). When an amount of the weak acid catalyst exceeds the above range and exceeds the upper limit value, storage stability may decrease or the physical properties of the coating film may deteriorate (e.g., contraction in appearance of the coating film may appear). When an amount of the weak acid catalyst is less than the lower limit in the above range, curing (crosslinking) reactivity may be lowered, low temperature curability may not be sufficient, and physical properties of the coating film may be deteriorated. An amount of the weak acid catalyst (E) in the aqueous base coating composition may more preferably be within the range of 0.1 to 5.0 parts by mass, based on 100 parts by mass of solid contents ((A2)+(D)) of the aqueous resin (A2) and the melamine resin (D) in the aqueous base coating composition. The above ranges may be more preferable when the weak acid catalyst (E) contains a phosphate compound.

In the aqueous base coating composition, a neutralization ratio to the coating composition may preferably be 50% or more. That is, in case that the total amount of acid groups contained in the coating composition is 100 mol %, it is preferable that the coating composition is neutralized with a basic compound so as to have a base amount of 50 mol % or more based on the total amount of the acid groups. The above state means that an amount of acid group without counter base (i.e., free acid group) theoretically exists not more than 50% in the coating composition. When a neutralization ratio is within the above range, stability of the coating composition in the aqueous medium can be maintained, and storage stability can be sufficiently secured. When a base amount is less than 50%, curing (crosslinking) reaction between the aqueous resin and the melamine resin during storage may be accelerated, thereby possibly reducing the storage stability. The neutralization ratio may preferably be more than 50%. In addition, the upper limit of the neutralization ratio to the coating composition may preferably be 150% or less. When it exceeds 150%, curing (crosslinking) reactivity may be lowered, low temperature curability may not be sufficient and the physical properties of the coating film may be deteriorated, because action of weak acid catalyst (E) is hindered.

As the basic compound, those commonly used as a neutralizing agent can be used. Examples of the basic compound include ammonia; amine compounds such as methylamine, ethylamine, dimethylamine, diethylamine, trimethylamine, triethylamine, dimethylethanolamine, diethanolamine, diethylaminoethanol, triethanolamine; hydroxides and carbonates of alkali metals or alkaline earth metals, and the like. The above compound may be used alone, or two or more of them may be used in combination.

In the aqueous base coating composition, since a melamine resin having a large amount of imino group and methylol group is used, settings of the range of the mass ratio of the aqueous resin (A2) and the melamine resin (D)

and the range of the neutralization ratio will affect storage stability. In a preferred embodiment of the present invention, when these are set in the optimum range, storage stability can be sufficiently secured even in the low-temperature curing technique, and this is one of the technical significance of the present invention.

The aqueous base coating composition may contain other than the above components, which, for example, the above-mentioned hydrophilicized-modified carbodiimide compound, water-dispersed block isocyanate. Containing at least one of them can improve low temperature curability.

The aqueous base coating composition can be prepared by mixing the respective components to constitute the coating composition with a means that is usually used. If necessary, the aqueous base coating composition may contain a pigment, a surface conditioner (a defoaming agent, a leveling agent, etc.), a pigment dispersing agent, a plasticizer, a film-forming assistant, an ultraviolet absorber, an antioxidant, a flame retardant, an antistatic agent, an electrostatic auxiliary, a heat stabilizer, a light stabilizer, a solvent (water, organic solvent), and other additives.

When the aqueous base coating composition contains a pigment, a content of the pigment may be set within a range usually set according to an application. For example, the PWC (Pigment Weight Concentration) of the pigment in % by mass based on 100 parts by mass in total of the total solid contents of the resin and the curing agent in the aqueous base coating composition may preferably be adjusted to 0.1 to 50% by mass.

Method for Forming a Multilayer Coating Film

The method for forming a multilayer coating film of the present invention includes:

an intermediate coating film formation step of applying an aqueous intermediate coating composition to an object to be coated to foam an uncured intermediate coating film;

a base coating film formation step of applying an aqueous base coating composition onto a resulting uncured intermediate coating film to form an uncured base coating film; and a curing step of curing the resulting uncured intermediate coating film and the base coating film by heating.

In the method for forming a multilayer coating film of the present invention, use of the specific aqueous intermediate coating composition and the aqueous base coating composition described above makes it possible to obtain a coating film excellent in coating film physical properties even under low-temperature curing conditions. The heat curing temperature of the coating film in the above curing step is not particularly limited, and may preferably be 70 to 120° C., more preferably 70 to 110° C., and even more preferably 70 to 100° C. In the method for forming a multilayer coating film of the present invention can be carried out under such a low-temperature curing condition of 100° C. or less. Such a low-temperature curing condition may be a curing condition where the heat curing temperature of the coating film is 70 to 90° C.

Object to be Coated

Examples of the object to be coated in the above method include steel plates of metal such as iron, steel, stainless steel, aluminum, copper, zinc, and tin and alloys thereof; resins such as polyethylene resin, EVA resin, polyolefin resins (polyethylene resin, polypropylene resin, etc.), vinyl chloride resin, styrol resin, polyester resins (including PET resin, PBT resin, etc.), polycarbonate resin, acrylic resin, acrylonitrile-butadiene-styrene (ABS) resin, acrylonitrile-styrene (AS) resin, polyamide resin, acetal resin, phenol resin, fluororesin, melamine resin, urethane resin, epoxy resin, and polyphenylene oxide (PPO); and organic-inorganic hybrid materials. These may have been molded.

The steel plate may be in a state where an electrodeposition coating film is formed after being subjected to a chemical conversion treatment. Examples of the chemical conversion treatment include zinc phosphate conversion, zirconium conversion, and chromic acid conversion. Examples of the electrodeposition coating film include electrodeposition coating films obtained by electrodeposition using a cationic electrodeposition coating composition or an anionic electrodeposition coating composition.

The resin may, if necessary, have been subjected to vapor cleaning using an organic solvent or may have been subjected to cleaning using a neutral detergent. Moreover, the resin may have been subjected to primer coating according to necessity.

The method for forming a multilayer coating film of the present invention is characterized in that it can provide a coating film excellent in coating film properties even under low-temperature curing conditions. Therefore, the object to be coated for which the method of the present invention can be used suitably may be, for example, an object to be coated including a steel plate part and a resin part. By the method for forming a multilayer coating film of the present invention, a multilayer coating film is formed on the object to be coated, so that it becomes possible to form a multilayer coating film having good physical properties at both the resin part and the steel plate part without applying heat by which thermal distortion of the resin part will be caused. By use of the method for forming a multilayer coating film of the present invention, a common coating composition can be applied even to different materials, namely, resin and steel plate. This offers an advantage that the hues of the coating films to be formed can be matched at a higher level.

Examples of other object to be coated that is suitable as the object to be coated in the method for forming a multilayer coating film of the present invention include industrial machines and construction machines. Industrial machines and construction machines are generally large and have a feature that their constituting base materials (steel plates) are thick as compared with automobile bodies in order to withstand a large load. Therefore, when such an industrial machine or a construction machine is the object to be coated, the object to be coated is large in heat capacity and there is a problem that heat is not transferred sufficiently to the object to be coated in a heating oven. The method for forming a multilayer coating film of the present invention is characterized in that the aqueous coating composition can be cured at low temperatures and in that a coating film having a high crosslinking density can be obtained even when the aqueous coating composition is cured at low temperatures. Therefore, the method for forming a multilayer coating film of the present invention can be used suitably also for application to objects to be coated which are large in heat capacity and difficult to be subjected to high-temperature heat curing treatment after application, namely, industrial machines and construction machines.

The aqueous intermediate coating composition and the aqueous base coating composition can be applied by an application method usually used. For example, when the aqueous intermediate coating composition and the aqueous base coating composition are applied to an automobile body, they can be applied by multi-stage application, preferably two-stage application with use of air-electrostatic spray, or alternatively, there can be used an application method combining air electrostatic spray and a rotary atomization type electrostatic applicator, which is so-called "μμ (micro micro)

bell", "µ (micro) bell", "metallic bell" or the like, in order to improve the appearance of a resulting coating film.

The thickness of the coating film of the aqueous intermediate coating composition may be chosen appropriately according to the desired use. The film thickness may preferably be, for example, 8 to 40 µm in terms of a dry film thickness, and more preferably 15 to 30 µm.

The thickness of the coating film of the aqueous base coating composition can be chosen appropriately according to the desired use. The film thickness may preferably be, for example, 10 to 30 µm in terms of a dried film thickness.

The method for forming a coating film of the present invention also includes an embodiment in which in a state where the base coating film is still uncured, a clear coating composition is further applied, thereby forming a clear coating film, and then an uncured multilayer coating film is cured. This method can omit a baking drying oven and therefore may be preferable from economical viewpoint and environmental protection viewpoint.

Examples of the clear coating composition that can be used suitably in the above coating step include a urethane clear coating composition. Examples of the urethane clear coating composition include clear coating compositions containing a hydroxyl group-containing resin and an isocyanate compound curing agent. The isocyanate compound as a curing agent is not particularly limited, and examples thereof include aliphatic isocyanates such as trimethylene diisocyanate, tetramethylene diisocyanate, pentamethylene diisocyanate, hexamethylene diisocyanate (HDI), and trimethylhexamethylene diisocyanate; aliphatic cyclic isocyanates such as 1,3-cyclopentane diisocyanate, 1,4-cyclohexane diisocyanate, and 1,2-cyclohexane diisocyanate; aromatic isocyanates such as xylylene diisocyanate (XDI), 2,4-tolylene diisocyanate (TDI), and 2,6-tolylene diisocyanate; alicyclic isocyanates such as isophorone diisocyanate (IPDI) and norboriiane diisocyanate; multimers such as biuret type and nurate type of these isocyanates; and mixtures thereof.

The hydroxyl value of the hydroxyl group-containing resin may preferably be within a range of 20 to 200 mgKOH/g. When the hydroxyl value exceeds the upper limit, the water resistance of a coating film will deteriorate, and when the hydroxyl value is less than the lower limit, the curability of a coating film will deteriorate. The lower limit may more preferably be 30 mgKOH/g, and the upper limit may more preferably be 180 mgKOH/g.

The number-average molecular weight of the hydroxyl group-containing resin may preferably be within a range of 1000 to 20000. When the number-average molecular weight is less than 1000, the workability and the curability may be insufficient. When the number-average molecular weight exceeds 20000, a nonvolatile portion during coating will be decreased and the workability may deteriorate. The lower limit may more preferably be 2000 and the upper limit may more preferably be 15000.

Moreover, the hydroxyl group-containing resin may preferably have an acid value within a range of 2 to 30 mgKOH/g. When the acid value exceeds the upper limit, the water resistance of a coating film will deteriorate, and when the acid value is less than the lower limit, the curability of a coating film will deteriorate. The lower limit may more preferably be 3 mgKOH/g, and the upper limit may more preferably be 25 mgKOH/g.

A content of the isocyanate compound relative to the hydroxyl group-containing resin may be chosen suitably within a range usually used by those skilled in the art. For example, it may be preferable to use the isocyanate compound in such an amount that an equivalent ratio of isocyanate groups (NCO) to hydroxyl groups (OH) (NCO/OH) falls within the range of 0.5 to 1.7. The lower limit may more preferably be 0.7, and the upper limit may more preferably be 1.5.

A method for producing the clear coating composition is not particularly limited and a method well-known to those skilled in the art may be used. The clear coating composition to be used may be a commercially available product. Examples of the cumercially available product include Polyure Excel O-1100 Clear and O-1200 Clear (produced by Nippon Paint Automotive Coatings Co., Ltd., isocyanate-curing type clear coating compositions).

When using the clear coating composition, a multilayer coating film can be formed by applying the aqueous base coating composition, thereby forming an uncured base coating film, and then applying the clear coating composition by wet-on-wet, and subsequently baking and curing them, for example, at 70 to 120° C., preferably at 70 to 110° C., more preferably at 70 to 100° C. for 10 to 30 minutes. A further low-temperature curing condition may be a curing condition to perform baking and curing at 70 to 90° C. for 10 to 30 minutes.

In the present invention, according to the material of the object to be coated, a clear coating composition other than the above-mentioned urethane clear coating composition can be used. For example, an acid epoxy curable type clear coating composition, an acrylic-melamine curable type clear coating composition, etc. may be used. Examples of such clear coating compositions include "Macflow O-570 Clear" and "Macflow O-1820 Clear" available from Nippon Paint Automotive Coatings Co., Ltd., which are clear coating compositions containing a polyepoxide and a polyacid, and "Super rack O-100 Clear" (trade name) available from Nippon Paint Automotive Coatings Co., Ltd., which is a clear coating composition containing an acrylic resin and melamine curing agent. The heat curing conditions for the case of using such clear coating compositions may be chosen appropriately according to the composition of the respective clear coating compositions. One example of the heat curing conditions for the case of using such clear coating compositions includes a condition of heating at 120 to 140° C. for 10 to 30 minutes.

As a method for applying the clear coating composition, the above-described known coating method can be used, and for example, the composition can be applied with an air spray, electrodeposition, or the like. The clear coating composition may preferably be applied so that the dry film thickness is generally 10 to 80 µm, preferably 20 to 50 µm.

EXAMPLES

The present invention will be described more specifically with reference to the following examples, but the present invention is not limited to the examples. In the examples, "parts" and "%" are on a mass basis unless otherwise indicated.

Production Example 1 Production of Acrylic Emulsion Having Hydroxyl Group and Carboxyl Group (AcEm-1)

A reaction vessel equipped with a stirrer, a nitrogen inlet tube, a temperature controller, a condenser, and a dropping funnel was charged with 2,000 parts of deionized water, and was then heated to 80° C. with stirring under nitrogen atmosphere.

A pre-emulsion was prepared by adding a monomer of 103 parts of styrene, 290 parts of n-butyl methacrylate, 280 parts of n-butyl acrylate, 302 parts of hydroxyethyl acrylate, 26 parts of acrylic acid, and, 3 parts of dodecyl mercaptan, 100 parts of LATEMUL PD-104 (produced by Kao CoLporation. 20% aqueous solution) as an emulsifier, to 1,000 parts of deionized water. Then, the resultant was emulsified, and resulting pre-emulsion was dropped over 2 hours together with an aqueous initiator solution prepared by dissolving 3 parts of ammonium persulfate in 300 parts of deionized water.

After the completion of the dropping, the reaction was continued at 80° C. for 1 hour, followed by cooling, and 8.2 parts of N,N-dimethylaminoethanol was added and thus an acrylic emulsion having a resin solid content of 30% by mass was obtained. The hydroxyl value of the acrylic emulsion, in terms of resin solid content, calculated from the monomer composition was 130 mgKOH/g and the acid value was 20 mgKOH/g. The acrylic resin in the resulting acrylic emulsion had a number-average molecular weight of 45,000 as determined by GPC measurement after removing water.

Production Example 2 Production of Aqueous Polyester Dispersion Having Hydroxyl Group and Carboxyl Group (PE-DP)

A reaction vessel equipped with a stirrer, a nitrogen inlet tube, a temperature controller, a condenser, and a decanter was charged with 250 parts of trimethylolpropane, 824 parts of adipic acid, and 635 parts of cyclohexanedicarboxylic acid, then the mixture was heated to 180° C., and then a condensation reaction was carried out until no more water distilled out. After cooling to 60° C., 120 parts of phthalic anhydride was added and the mixture was heated to 140° C. and held for 60 minutes, and thus a polyester resin having a number-average molecular weight of 2,000 as determined by GPC measurement was obtained. Fifty nine parts of dimethylaminoethanol (corresponding to 80% of the acid value of the resin (neutralization ratio: 80%)) was added at 80° C., and 1920 parts of deionized water was further added, followed by stirring, and thus an aqueous polyester dispersion having a resin solid content of 45% by mass was obtained. The hydroxyl value of the aqueous polyester dispersion in terms of resin solid content was 90 mgKOH/g and the acid value was 35 mgKOH/g.

Production Example 3 Production of Hydrophilicized Modified Carbodiimide Compound (1)

By reacting 700 parts of 4,4-dicyclohexylmethane diisocyanate with 7 parts of 3-methyl 1-phenyl 2-phospholene-1-oxide at 170° C. for 7 hours, obtained was a carbodiimide compound with the structure represented by the above formula (a), the carbodiimide compound having three carbodiimide groups in one molecule and having isocyanate groups at its both ends.

Next, to 180 parts of the produced 4,4-dicyclohexylmethanecarbodiimide having isocyanate ends were added 95 parts of PTMG-1000 (polytetramethylene glycol having a number-average molecular weight of 1,000 produced by Mitsubishi Chemical; repeat number of tetramethylene oxide calculated from number-average molecular weight was 13.6) and 0.2 parts of dibutyltin dilaurate, and the mixture was then heated to 85° C. and held for 2 hours.

Subsequently, 86.4 parts of Methyl Poly Glycol 130 (polyethylene glycol monomethyl ether produced by Nippon Nyukazai Co., Ltd.; repeat number of ethylene oxide calculated from hydroxyl value of 130 mgKOH/g was 9) was added and then the mixture was held at 85° C. for 3 hours. After confirming disappearance of a peak of NCO by IR measurement, the reaction was finished, followed by cooling to 60° C., and then deionized water was added, and thus an aqueous dispersion of a hydrophilicized-modified carbodiimide compound (1) having a resin solid content of 40% by mass was obtained. The resulting hydrophilicized-modified carbodiimide compound was a compound represented by the above formula (I).

Production Example 4 Production of Hydrophilicized Modified Carbodiimide Compound (2)

To 90 parts of the 4,4-dicyclohexylmethanecarbodiimide having isocyanate ends produced in Production Example 3 were added 120 parts of polypropylene glycol monobutyl ether having an average repeat number of 19, 43.2 parts of Methyl Poly Glycol 130, and 0.07 parts of dibutyltin dilaurate, and the temperature was held at 80° C. until absorption of NCO disappeared in an IR spectrum. After cooling to 60° C., deionized water was added and thus an aqueous dispersion of a hydrophilicized-modified carbodiimide compound (2) having a resin solid content of 25% was obtained. The resulting hydrophilicized-modified carbodiimide compound was a compound represented by the above formula (III).

In the resulting hydrophilicized-modified carbodiimide compound, the ratio of (i) a structure resulting from elimination of a hydroxyl group from polyethylene glycol monoalkyl ether and (ii) a structure resulting from elimination of a hydroxyl group from polypropylene glycol monoalkyl ether was (i):(ii)=1.0:1.0.

Production Example 5 Production of Hydrophilicized Modified Carbodiimide Compound (3)

By reacting 393 parts of 4,4-dicyclohexylmethane diisocyanate with 8 parts of 3-methyl-1-phenyl-2-phospholene-1-oxide at 180° C. for hours, obtained was a carbodiimide compound having four carbodiimide groups in one molecule and having isocyanate groups at both ends. Here, 130 parts of polyethylene glycol monomethyl ether having an oxyethylene group repeat number of 9 and 0.2 parts of dibutyltin dilaurate were added, followed by heating at 90° C. for 2 hours, and thus a carbodiimide compound having an isocyanate group and a hydrophilic group at its ends was obtained. In addition, 300 parts of GP-3000 (trihydric polyol having a structure in which 17 mol, in average, of propylene oxide was added to respective three hydroxyl groups of glycerol, produced by Sanyo Chemical Industries, Ltd.) was added and was reacted at 90° C. for 6 hours. After confirming disappearance of a peak of NCO by IR measurement, the reaction was finished and thus a hydrophilicized-modified carbodiimide compound (3) was obtained. Deionized water was added thereto and thus an aqueous dispersion of the hydrophilicized-modified carbodiimide compound (3) having a resin solid content of 30% by mass was obtained. The resulting hydrophilicized-modified carbodiimide compound was a compound represented by the above formula (II).

Production Example 6 Production of Coloring Pigment Paste

After preliminarily mixing 9.2 parts of a commercially available dispersing agent "Disperbyk 190" (produced by BYK-Chemie), 17.8 parts of ion-exchanged water, and 73.0 parts of rutile type titanium dioxide, a bead medium was added to the mixture in a paint conditioner, and mixed and dispersed at room temperature until the particle size reached 5 μm or less, and then the bead medium was removed by filtration and thus a coloring pigment paste was obtained.

Production Example 7 Production of Emulsion Resin (Aqueous Resin) Having Hydroxyl Value of Less than 80 mgKOH/g To reaction vessel containing 194.1 parts of ion-exchanged water were added 0.2 parts of ADEKA REASOAP NE-20 (α-[1-[(allyloxy)methyl]-2-(nonylphenoxy)ethyl]-(1)-hydroxyoxyethylene, produced by ADEKA Corporation, aqueous solution having a solid content of 80% by mass) and 0.2 parts of Aqualon HS-10 (polyoxyethylene alkylpropenylphenyl ether sulfate, produced by DES Co. Ltd.), the mixture was then heated to 80° C. with mixing and stirring under a nitrogen flow. Subsequently, a monomer mixture composed of 18.5 parts of methyl acrylate, 31.7 parts of ethyl acrylate, 5.8 parts of 2-hydroxyethyl acrylate, 10.0 parts of styrene, 4.0 parts of acrylamide, 0.3 parts of ADEKA REASOAP NE-20, 0.2 parts of Aqualon HS-10, and 70 parts of ion-exchanged water as an α,β-ethylenically unsaturated monomer mixture for the first step, and an initiator solution composed of 0.2 parts of ammonium persulfate and 7 parts of ion-exchanged water were dropped in parallel into the reaction vessel over 2 hours. After the completion of the dropping, aging was carried out at the same temperature for 1 hour.

Further, a monomer mixture composed of 24.5 parts of ethyl acrylate, 2.5 of 2-hydroxyethyl acrylate, 3.1 parts of methacrylic acid, 0.3 parts of Aqualon HS-10, and 30 parts of ion-exchanged water as an α,β-ethylenically unsaturated monomer mixture for the second step, and an initiator solution composed of 0.1 parts of ammonium persulfate and 3 parts of ion-exchanged water were dropped in parallel into the reaction vessel at 80° C. over 0.5 hours. After the completion of the dropping, aging was carried out at the same temperature for 2 hours.

Subsequently, the mixture was cooled to 40° C. and was filtered with a 400 mesh filter. Further, a 10% by mass aqueous dimethylaminoethanol solution was added and the pH was adjusted to 7, and thus an emulsion resin having an average particle diameter of 110 nm, a solid content of 24% by mass, an acid value of 20 mgKOH/g and a hydroxyl value of 40 mgKOH/g in terms of resin solid content was obtained. The glass transition point was calculated to be 0° C. based on the whole monomer composition.

Example 1

Production of Aqueous Intermediate Coating Composition

Stirred were 158 parts (resin solid content: 30% by mass) of the acrylic emulsion (AcEm-1) serving as an aqueous resin (A1) obtained in Production Example 1, and 18.7 parts (resin solid content: 45% by mass) of the aqueous polyester dispersion (PE-DP) obtained in Production Example 4. To this was added 137.7 parts of the colored pigment paste of Production Example 6, the pH was adjusted to 8.0 with 0.01 parts of dimethylethanolamine (produced by KISHIDA CHEMICAL Co., Ltd.), and 1.0 part of ADEKA NOL UH-814N (trade name, urethane association type thickening agent, active ingredient: 30% by mass, produced by ADEKA Co., Ltd.) was mixed and stirred, and the mixture was stirred until it became uniform. To this was added 40.9 parts of BAYHYDUR 305 (polyisocyanate compound having an ethylene oxide group produced by Sumika Bayer Urethane Co., Ltd., ethylene oxide content: 20% by mass, isocyanate group content: 16% by mass) serving as a polyisocyanate compound (B), and 8.3 parts (resin solid content: 40% by mass) of the hydrophilicized-modified carbodiimide compound (1) of Preparation Example 3 was further added while being stirred, and the mixture was stirred, so that an aqueous intermediate coating composition was obtained.

Production of Aqueous Base Coating Composition

Mixing of 116.7 parts (resin solid content: 30% by mass) of the hydroxyl group-containing acrylic resin emulsion serving as an aqueous resin (A2) obtained in Production Example 1 and 104.2 parts (resin solid content: 24% by mass) of the acrylic emulsion resin having a hydroxyl value of less than 80 mgKOH/g obtained in Production Example 7 was performed. To the resulting mixture were added 66.7 parts (resin solid content: 30% by mass) of the aqueous polyurethane resin (F) given in the table, 21 parts (solid content: 65% by mass) of Alpaste MH8801 (aluminum pigment produced by Asahi Kasei Corporation) as a luster pigment, 5 parts of a phosphate group-containing acrylic resin, and 0.3 parts of lauryl acid phosphate. Further, 30 parts of 2-ethylhexanol, 3.3 parts of ADEKA NOL UH-814N (thickening agent produced by ADEKA Corporation, solid content: 30% by mass), 0.01 parts of dimethylethanolamine (produced by KISHIDA CHEMICAL Co., Ltd.), and 150 parts of ion-exchanged water, further, 20 parts (resin solid content) of "Cymel 701" manufactured by Allnex Japan corporation as the melamine resin (D) were added. Next, 0.5% (solid content=only an effective amount of catalyst) of "CYCAT (registered trademark) 296-9" (weak-acidic phosphate ester, pKa (H$_2$O) of 1.8 or more) manufactured by Annex Japan corporation as the weak acid catalyst (E), based on the total solid content of the acrylic emulsion of the aqueous resin (A2) and the melamine resin (D), was added while stirring, and then, 0.5 part of N,N-dimethylaminoethanol (neutralizing agent) was added and stirred, to obtain an aqueous base coating composition. PWC of the obtained coating composition was 12.0% by mass.

"Cymel 701" used in this example was an imino-methylol type melamine resin, in which the average imino group amount per one melamine nucleus was 1.0 or more and less than 1.5, and the average methylol group amount was 0.5 or more and less than 1.0.

Multilayer Coating Film Formation

Powernics 150 (trade name, cationic electrodeposition coating material produced by Nippon Paint Automotive Coatings Co., Ltd.) was electrodeposition coated on dull steel sheet treated with zinc phosphate such that the thickness of the dry coating film was 20 μm, followed by heat-curing at 160° C. for 30 minutes and subsequent cooling, and thus a steel substrate was prepared as an object to be coated.

The aqueous intermediate coating composition was applied to the resulting substrate (an object to be coated) by using a rotary atomization type electrostatic applicator such that the thickness of the dry coating film was 25 μm, and then the aqueous base coating material was applied by using a rotary atomization type electrostatic applicator such that the thickness of the dry coating film was 15 μm, followed by preheating at 80° C. for 3 minutes. The aqueous base coating composition was applied after an interval of 6 minutes from the application of the aqueous intermediate coating composition. In addition, Polyure Excel 0-1200 (trade name, produced by Nippon Paint Automotive Coatings Co., Ltd., polyisocyanate compound-containing two-components acrylic urethane-based organic solvent type clear coating material) was applied to the coated plate by using a rotary atomization type electrostatic applicator such that the thickness of the dry coating film was 35 μm, and then was heated and cured at 80° C. for 20 minutes, and thus a specimen on which a multilayer coating film had been farmed was obtained.

Example 2

Aqueous base coating composition was produced in the same manner as in Example 1 except that "Cymel 202" manufactured by Allnex Japan corporation as the melamine resin (D) was used.

"Cymel 202" used in this example was an imino-methylol type melamine resin, in which the average imino group amount per one melamine nucleus was 1.5 or more, and the average methylol group amount was 0.5 or more and less than 1.0.

A multilayer coating film was formed in the same manner as in Example 1 except that the aqueous base coating composition obtained was used.

The amount of each component shown in the following tables is indicated by its solid content.

Example 3

Aqueous base coating composition was produced in the same manner as in Example 1 except that 20 parts of a high imino-methylol type melamine resin (resin solid amounts, the average imino group amount per one melamine nucleus was 2.5 or more, and the average methylol group amount was about 1.0) as the melamine resin (D) was used.

A multilayer coating film was formed in the same manner as in Example 1 except that the aqueous base coating composition obtained was used.

Examples 4-8

Aqueous base coating compositions were produced in the same manner as in Example 3 except that the types and used amounts of the respective components were changed as shown in the following tables in the production of the aqueous base coating compositions.

A multilayer coating film was formed in the same manner as in Example 1 except that the aqueous base coating composition obtained was used.

Examples 9-10

Aqueous base coating compositions were produced in the same manner as in Example 1 except that the types of the hydrophilicized-modified carbodiimide compound (C) were changed as shown in the following tables in the production of the aqueous base coating compositions.

A multilayer coating film was formed in the same manner as in Example 1 except that the aqueous base coating composition obtained was used.

Example 11

WB-3110CB (trade name, manufactured by Nippon Paint Automotive Coatings Co., Ltd., a conductive coating composition containing non-chlorinated polyolefin) was applied to a resin member (polypropylene) as an aqueous primer for adhesion by a rotary atomization electrostatic coating machine, so as to have a film thickness of 15 μm. A multilayer coating film was formed in the same manner as in Example 1 except that the obtained resin member was used as a coating object.

Comparative Example 1

An aqueous intermediate coating composition was prepared in the same manner as in Example 1 except that no hydrophilicized-modified carbodiimide compound (C) was used and the amounts of the respective components were changed to the amounts shown in the following table in the production of the aqueous intermediate coating composition.

A multilayer coating film was formed in the same manner as in Example 1 except that the aqueous intermediate coating composition obtained was used.

Comparative Examples 2

Aqueous base coating composition was produced in the same manner as in Example 1 except that "Cymel 327" manufactured by Allnex Japan Corporation as the melamine resin (D) was used.

A multilayer coating film was formed in the same manner as in Example 1 except that the aqueous base coating composition obtained was used.

"Cymel 327" used in this comparative example was an imino type melamine resin, in which the average imino group amount per one melamine nucleus was 1.0 or more and less than 1.5, and the average methylol group amount was less than 0.5.

Comparative Examples 3

Aqueous base coating composition was produced in the same manner as in Example 1 except that "Cymel 211" manufactured by Annex Japan Corporation as the melamine resin (D) was used.

A multilayer coating film was formed in the same manner as in Example 1 except that the aqueous base coating composition obtained was used.

"Cymel 211" used in this comparative example was an imino type melamine resin, in which the average imino group amount per one melamine nucleus was 1.5 or more, and the average methylol group amount was less than 0.5.

Comparative Example 4

Aqueous base coating composition was produced in the same manner as in Example 1 except that "Cymel 303" manufactured by Annex Japan corporation as the melamine resin (D) was used.

A multilayer coating film was formed in the same manner as in Example 1 except that the aqueous base coating composition obtained was used.

"Cymel 303" used in this example was an methylol type melamine resin, in which the average imino group amount per one melamine nucleus was less than 1.0, and the average methylol group amount was less than 0.5.

Comparative Examples 5 to 7

Aqueous base coating compositions were produced in the same manner as in Example 1 except that used amounts of the respective components were changed as shown in the following tables in the production of the aqueous base coating compositions.

A multilayer coating film was formed in the same manner as in Example 1 except that the aqueous base coating composition obtained was used.

Comparative Example 8

Aqueous base coating composition was produced in the same manner as in Example 1 except that the types of the aqueous polyurethane resin (F) was changed as shown in the following tables in the production of the aqueous base coating compositions.

A multilayer coating film was foamed in the same manner as in Example 1 except that the aqueous base coating composition obtained was used.

The measurement of a number-average molecular weight in the examples is a value measured under the following GPC system measurement conditions.

Instrument: HLC-8220 GPC manufactured by Tosoh Corporation
Column: Shodex KF-606 M, KF-603
Flow rate: 0.6 ml/min
Detector: RI, UV 254 nm
Mobile phase: tetrahydrofuran
Standard samples: TSK STANDARD POLYSTYRENE (produced by Tosoh Corporation), A-500, A-2500, F-1, F-4, F-20, F-80, F-700, 1-phenylhexane (produced by Aldrich)

The elongation at break of each of the aqueous polyurethane resins used in the examples and the comparative examples was measured by the following procedure.

Measurement of Elongation at Break of Aqueous Polyurethane Resin

Ninety-five parts (resin solid content amount) of an aqueous polyurethane resin and 5 parts by mass (resin solid content amount) of the hydrophilicized-modified carbodiimide compound (C) described in Production Example 5 were mixed such that the two resin solid contents thereof was 100 parts by mass in total. In a clean environment where dusts or the like do not adhere, the mixed liquid prepared was applied onto a flat polypropylene plate uniformly with a doctor blade such that the thickness of the dry coating film was 20 μm. After leaving at rest at 20° C. for 10 minutes, the resulting plate was preheated at 80° C. for 3 minutes, thereby volatilizing water, and then was baked at 120° C. for 30 minutes, and thus a cured film was prepared. The cured film obtained was subjected to a tensile performance test at a testing temperature of −20° C. in accordance with JIS K7127 and an elongation ratio at the time of breaking (elongation at break) was measured. Measurement was performed 20 times and the average of 18 measurements except the maximum and the minimum values was taken as the elongation at break of the sample.

The multilayer coating films obtained in the above examples and comparative examples were subjected to the following evaluations. The test results obtained are summarized in the following tables.

Evaluation of Water-Resistant Adhesion

The test plates obtained were immersed in warm water at 40° C. for 240 hours and removed therefrom, and were then dried at 20° C. for 24 hours. Lattice-like cuts were made in the multilayer coating film on each of the test plates with a knife to reach the base material, so that 100 crosscuts having a size of 2 mm×2 mm were made. Subsequently, an Adhesive Cellophane Tape (trademark) was affixed to each of the test plates, the tape was abruptly peeled off at 20° C., and the number of remaining crosscut coating films was counted.

The relative merits of the coating film can be judged from the number of peeled crosscut sections. Even if only one crosscut section peeled, the sample is judged to be difficult to be used practically.

Evaluation of Moisture-Resistant Shrinkage

The test plates were exposed to an atmosphere with a temperature of 50° C. and a humidity of 99% for 240 hours, and then dried at 20° C. for 24 hours. The state of the coating film in each of the test plates was visually examined, and change in appearance before and after the test was observed. Under the following criteria, test plates with rating ○ or ○Δ is judged to be practicality usable.

○: Almost no difference is observed in gloss and smoothness.
○Δ: Slight change is observed in gloss or smoothness.
Δ: Change is observed in gloss and smoothness.
Δx: Change is observed in both gloss and smoothness, and especially, change in gloss is remarkable.
x: Remarkable difference is observed in both gloss and smoothness.

Evaluation of Moisture Blister Resistance

The test plates were exposed to an atmosphere with a temperature of 50° C. and a humidity of 99% for 240 hours, and then dried at 20° C. for 24 hours. The state of the coating film in each of the test plates was visually examined, and change in appearance before and after the test was observed. Under the following criteria, test plates with rating ○ or ○Δ is judged to be practicality usable.

○: There is almost no blister.
○Δ: There is a blister as small as 0.01 mm or less, which disappears almost completely when being additionally dried at 20° C. for 24 hours.
Δ: There is a blister as small as 0.01 mm or less, which does not disappears even when being additionally dried at 20° C. for 24 hours.
Δx: There is a blister as large as 0.01 mm or more and 0.05 mm or less, which does not disappear even when being additionally dried at 20° C. for 24 hours.
x: There is a blister as large as 0.05 mm or more, which does not disappear even when being additionally dried at 20° C. for 24 hours.

Evaluation of Moisture-Resistant Adhesion

After exposing each of the test plates to an atmosphere having a temperature of 50° C. and a humidity of 99% for 240 hours, it was dried at 20° C. for 24 hours, and lattice-like cuts were made in the multilayer coating film of the test plate with a knife to reach the base material, so that 100 crosscuts having a size of 2 mm×2 mm were made. Subsequently, an Adhesive Cellophane Tape was affixed to each of the test plates, the tape was abruptly peeled off at 20° C., and the number of remaining crosscut coating films was counted.

The relative merits of the coating film can be judged from the number of peeled crosscut sections. Even if only one crosscut section peeled, the sample is judged to be difficult to be used practically.

Evaluation of Chipping Resistance

The test plates each with a layered coating film obtained in the examples and the comparative examples were subjected to a stepping stone test under the conditions shown below using a Gravelometer ESS-1 (produced by Suga Test Instruments Co., Ltd.).

<Test Conditions>
Stone size: 6 to 8 mm
Amount of stone: 0.7 to 0.8 g/piece
Distance: 35 cm
Shot pressure: 0.6 kg/cm²
Shot angle: 45°

Test temperature: −20° C.

The test plates after the stepping stone test were evaluated visually according to the following criteria. Under the following criteria, when the score is 4 or more, the test plate can be used practically and is judged to be acceptable.
5: Almost no exfoliation is observed.
4: There is a small exfoliated area, but almost no exfoliation is observed at the interface between the electrodeposition coating film and the intermediate coating film.
3: The exfoliated area is slightly large and exfoliation is observed at the interface between the electrodeposition coating film and the intermediate coating film.
2: The exfoliated area is large and exfoliation is observed at the interface between the electrodeposition coating film and the intemediate coating film.
1: The exfoliated area is large and the electrodeposition coating film is broken.

TABLE 1

| | | | Example 1 | Example 2 | Example 3 | Example 4 | Example 5 | Example 6 |
|---|---|---|---|---|---|---|---|---|
| Primer | | | — | — | — | — | — | — |
| Intermediate coating composition | Polyisocyanate compound (B) | Type | EO type | EO type | EO type | EO type | EO type | EO type |
| | | Used amount | 40.9 | 40.9 | 40.9 | 40.9 | 40.9 | 40.9 |
| | Hydrophilicized-modified carbodiimide compound (C) | Type | Production example 3 | Production example 3 | Production example 3 | Production example 3 | Production example 3 | Production example 3 |
| | | Used amount | 3.3 | 3.3 | 3.3 | 3.3 | 3.3 | 3.3 |
| | Aqueous resin (A1) | Type | AcEm-1 | AcEm-1 | AcEm-1 | AcEm-1 | AcEm-1 | AcEm-1 |
| | | Used amount | 47.4 | 47.4 | 47.4 | 47.4 | 47.4 | 47.4 |
| | | Type | PE-DP | PE-DP | PE-DP | PE-DP | PE-DP | PE-DP |
| | | Used amount | 8.4 | 8.4 | 8.4 | 8.4 | 8.4 | 8.4 |
| | Total of the above resin solid contents | | 100.0 | 100.0 | 100.0 | 100.0 | 100.0 | 100.0 |
| Aqueous base coating composition | Melamine resin (D) | Type | C701 | C202 | High-MF | High-MF | High-MF | High-MF |
| | | Used amount | 20 | 20 | 20 | 20 | 15 | 25 |
| | Aqueous resin (A2) | Type | AcEm-1 | AcEm-1 | AcEm-1 | AcEm-1 | AcEm-1 | AcEm-1 |
| | | Used amount | 35 | 35 | 35 | 35 | 40 | 40 |
| | Ratio (A2)/(D) | | 1.8 | 1.8 | 1.8 | 1.8 | 2.7 | 1.6 |
| | Weak acid catalyst (E) | Type | C-296-9 (weak acid) | C-296-9 (weak acid) | C-296-9 (weak acid) | C-296-9 (weak acid) | C-296-9 (weak acid) | C-296-9 (weak acid) |
| | | Used amount* | 0.5 | 0.5 | 0.5 | 0.25 | 0.5 | 0.5 |
| | Aqueous resin having a hydroxyl value of less than 80 mg KOH/g | Used amount | 25 | 25 | 25 | 25 | 25 | 15 |
| | Aqueous polyurethane resin (F) | Type | D | D | D | D | D | D |
| | | Used amount | 20 | 20 | 20 | 20 | 20 | 20 |
| | | Tg | −60 | −60 | −60 | −60 | −60 | −60 |
| | | Elongation at break | 610 | 610 | 610 | 610 | 610 | 610 |
| | Total of the above resin solid contents | | 100 | 100 | 100 | 100 | 100 | 100 |
| Performance after curing of 80° C. for 20 min. | Clear coating composition | | ○ | ○ | ○ | ○ | ○ | ○ |
| | Water-resistant adhesion (Number of 100-crosscuts peeled sections) | | 0 | 0 | 0 | 0 | 0 | 0 |
| | Moisture-resistant shrinkage | | ○ | ○ | ○ | ○Δ | ○Δ | ○ |
| | Moisture blister resistance | | ○ | ○ | ○ | ○Δ | ○ | ○ |
| | Moisture-resistant adhesion (Number | | 0 | 0 | 0 | 0 | 0 | 0 |
| | Chipping resistance (5: Good; 4 or more: Acceptable) | | 5 | 5 | 5 | 5 | 5 | 5 |

TABLE 2

| | | | Example 7 | Example 8 | Example 9 | Example 10 | Example 11 |
|---|---|---|---|---|---|---|---|
| Primer | | | — | — | — | — | With primer |
| Intermediate coating composition | Polyisocyanate compound (B) | Type | EO type | EO type | EO type | EO type | EO type |
| | | Used amount | 40.9 | 40.9 | 40.9 | 40.9 | 40.9 |
| | Hydrophilicized-modified carbodiimide compound (C) | Type | Production example 3 | Production example 3 | Production example 4 | Production example 5 | Production example 3 |
| | | Used amount | 3.3 | 3.3 | 3.3 | 3.3 | 3.3 |

TABLE 2-continued

|  |  |  | Example 7 | Example 8 | Example 9 | Example 10 | Example 11 |
|---|---|---|---|---|---|---|---|
| Aqueous base coating composition | Aqueous resin (A1) | Type | AcEm-1 | AcEm-1 | AcEm-1 | AcEm-1 | AcEm-1 |
|  |  | Used amount | 47.4 | 47.4 | 47.4 | 47.4 | 47.4 |
|  |  | Type | PE-DP | PE-DP | PE-DP | PE-DP | PE-DP |
|  |  | Used amount | 8.4 | 8.4 | 8.4 | 8.4 | 8.4 |
|  | Total of the above resin solid contents |  | 100.0 | 100.0 | 100.0 | 100.0 | 100.0 |
|  | Melamine resin (D) | Type | High-MF | High-MF | C701 | C701 | C701 |
|  |  | Used amount | 40 | 20 | 20 | 20 | 20 |
|  | Aqueous resin (A2) | Type | AcEm-1 | AcEm-1 | AcEm-1 | AcEm-1 | AcEm-1 |
|  |  | Used amount | 30 | 35 | 35 | 35 | 35 |
|  | Ratio (A2)/(D) |  | 0.8 | 1.8 | 1.8 | 1.8 | 1.8 |
|  | Weak acid catalyst (E) | Type | C-296-9 (weak acid) | C-296-9 (weak acid) | C-296-9 (weak acid) | C-296-9 (weak acid) | C-296-9 (weak acid) |
|  |  | Used amount* | 0.5 | 0.5 | 0.5 | 0.5 | 0.5 |
|  | Aqueous resin having a hydroxyl value of less than 80 mg KOH/g | Used amount | 10 | 35 | 25 | 25 | 25 |
|  | Aqueous polyurethane resin (F) | Type | D | D | D | D | D |
|  |  | Used amount | 20 | 10 | 20 | 20 | 20 |
|  |  | Tg | −60 | −60 | −60 | −60 | −60 |
|  |  | Elongation at break | 610 | 610 | 610 | 610 | 610 |
|  | Total of the above resin solid contents |  | 100 | 100 | 100 | 100 | 100 |
| Performance after curing of 80° C. for 20 min. | Clear coating composition |  | ○ | ○ | ○ | ○ | ○ |
|  | Water-resistant adhesion (Number of 100-crosscuts peeled sections) |  | 0 | 0 | 0 | 0 | 0 |
|  | Moisture-resistant shrinkage |  | ○Δ | ○ | ○ | ○ | ○ |
|  | Moisture blister resistance |  | ○Δ | ○ | ○ | ○ | ○ |
|  | Moisture-resistant adhesion (Number of 100-crosscuts peeled sections) |  | 0 | 0 | 0 | 0 | 0 |
|  | Chipping resistance (5: Good; 4 or more: Acceptable) |  | 5 | 4 | 5 | 5 | 5 |

TABLE 3

|  |  |  | Comparative example 1 | Comparative example 2 | Comparative example 3 | Comparative example 4 | Comparative example 5 | Comparative example 6 | Comparative example 7 | Comparative example 8 |
|---|---|---|---|---|---|---|---|---|---|---|
| Primer |  |  | — | — | — | — | — | — | — | — |
| Intermediate coating composition | Polyisocyanate compound (B) | Type | EO type | EO type | EO type | EO type | EO type | EO type | EO type | EO type |
|  |  | Used amount | 40.9 | 40.9 | 40.9 | 40.9 | 40.9 | 40.9 | 40.9 | 40.9 |
|  | Hydrophilicized-modified carbodiimide compound (C) | Type | Production example 3 | Production example 3 | Production example 3 | Production example 3 | Production example 3 | Production example 3 | Production example 3 | Production example 3 |
|  |  | Used amount | 0 | 3.3 | 3.3 | 3.3 | 3.3 | 3.3 | 3.3 | 3.3 |
|  | Aqueous resin (A1) | Type | AcEm-1 | AcEm-1 | AcEm-1 | AcEm-1 | AcEm-1 | AcEm-1 | AcEm-1 | AcEm-1 |
|  |  | Used amount | 50.7 | 47.4 | 47.4 | 47.4 | 47.4 | 47.4 | 47.4 | 47.4 |
|  |  | Type | PE-DP | PE-DP | PE-DP | PE-DP | PE-DP | PE-DP | PE-DP | PE-DP |
|  |  | Used amount | 8.4 | 8.4 | 8.4 | 8.4 | 8.4 | 8.4 | 8.4 | 8.4 |
|  | Total of the above resin solid contents |  | 100.0 | 100.0 | 100.0 | 100.0 | 100.0 | 100.0 | 100.0 | 100.0 |
| Aqueous base coating composition | Melamine resin (D) | Type | C701 | C327 | C211 | C303 | C701 | C701 | C701 | C701 |
|  |  | Used amount | 20 | 20 | 20 | 20 | 20 | 20 | 5 | 20 |
|  | Aqueous resin (A2) | Type | AcEm-1 | AcEm-1 | AcEm-1 | AcEm-1 | AcEm-1 | AcEm-1 | AcEm-1 | AcEm-1 |
|  |  | Used amount | 35 | 35 | 35 | 35 | 35 | 10 | 50 | 35 |

TABLE 3-continued

|  |  |  | Comparative example 1 | Comparative example 2 | Comparative example 3 | Comparative example 4 | Comparative example 5 | Comparative example 6 | Comparative example 7 | Comparative example 8 |
|---|---|---|---|---|---|---|---|---|---|---|
|  | Ratio (A2)/(D) |  | 1.8 | 1.8 | 1.8 | 1.8 | 1.8 | 0.5 | 10.0 | 1.8 |
|  | Weak acid catalyst (E) | Type | C-296-9 (weak acid) | C-296-9 (weak acid) | C-296-9 (weak acid) | C-296-9 (weak acid) | C-296-9 (weak acid) | C-296-9 (weak acid) | C-296-9 (weak acid) | C-296-9 (weak acid) |
|  |  | Used amount* | 0.5 | 0.5 | 0.5 | 0.5 | 0 | 0.5 | 0.5 | 0.5 |
|  | Aqueous resin having a hydroxyl value of less than 80 mg KOH/g | Used amount | 25 | 25 | 25 | 25 | 25 | 55 | 25 | 25 |
|  | Aqueous polyurethane resin (F) | Type | D | D | D | D | D | D | D | A |
|  |  | Used amount | 20 | 20 | 20 | 20 | 20 | 20 | 20 | 20 |
|  |  | Tg | −60 | −60 | −60 | −60 | −60 | −60 | −60 | −10 |
|  |  | Elongation at break | 610 | 610 | 610 | 610 | 610 | 610 | 610 | 12 |
|  | Total of the above resin solid |  | 100 | 100 | 100 | 100 | 100 | 105 | 100 | 100 |
|  | Clear coating composition |  | ○ | ○ | ○ | ○ | ○ | ○ | ○ | ○ |
| Performance after curing of 80° C. for 20 min. | Water-resistant adhesion (Number of 100-crosscuts peeled sections) |  | 10 | 0 | 0 | 0 | 0 | 0 | 0 | 0 |
|  | Moisture-resistant shrinkage |  | ○ | Δ | Δ | X | X | Δ | ΔX | ○Δ |
|  | Moisture blister resistance |  | ○ | ΔX | Δ | X | X | Δ | Δ | Δ |
|  | Moisture-resistant adhesion (Number |  | 30 | 0 | 0 | 0 | 0 | 0 | 0 | 0 |
|  | Chipping resistance (5: Good; 4 or more: Acceptable) |  | 5 | 5 | 5 | 2 | 2 | 3 | 3 | 3 |

The types of the aqueous polyurethane resins (F) shown in the above tables are as follows.
A: N9603 (produced by Kusumoto Chemicals, Ltd.), solid concentration:
34%, Tg: −10° C., elongation at break: 12%
D: PERMARIN U150 (produced by Sanyo Chemical Industries, Ltd.), solid concentration: 30%, Tg: −60° C., elongation at break: 610%

In the above tables, "AcEm-1" shown in the columns of aqueous resin represents the acrylic emulsion obtained in Production Example 1. "PE-DP" represents the aqueous polyester dispersion having a hydroxyl group and a carboxyl group obtained in Production Example 2.

"C—" shown in the columns of melamine resin (D) is an abbreviation for "Cymel". "High-MF" represents a high imino-methylol type melamine resin, having adjusted average imino group amount of 2.5 or more, and average methylol group amount of about 1.0, per one melamine nucleus.

"C—" shown in the field of weak acid catalyst (E) is an abbreviation for "CYCAT".

The amount * of the weak acid catalyst (E) is a % by mass based on the solid content mass of the aqueous resin (A2) and the melamine resin (D) contained in the aqueous base coating composition, and is a value calculated by the following formula.

Amount of weak acid catalyst=$(E)/((A2)+(D))$(% by mass)

Each of the multilayer coating films obtained in the examples was confirmed to have excellent water resistance, moisture resistance, and chipping resistance even after the multilayer coating films were subjected to baking and curing at a low-temperature condition of 80° C.

On the other hand, the multilayer coating films obtained in the comparative examples were confirmed to be inferior in one or two or more of water resistance, moisture resistance, and chipping resistance.

Comparative Example 1 is an example in which no hydrophilicized-modified carbodiimide compound (C) is contained in the aqueous intermediate coating composition. In this case, the multilayer coating film obtained is clearly inferior in water resistance.

Comparative Examples 2-4 are examples in which type of the melamine resin (D) contained in the aqueous base coating composition is out of the range of claims according to the present invention. In these cases, the multilayer coating film obtained is clearly inferior in moisture-resistance.

Comparative Example 5 is an example in which no weak acid catalyst (E) is contained in the aqueous base coating composition.

In this case, the multilayer coating film obtained is inferior in chipping resistance and moisture-resistance.

Comparative Examples 6-7 are examples in which a mass ratio of the aqueous resin and the melamine resin (D) contained in the aqueous base coating composition is out of the range of claims according to the present invention. In these cases, the multilayer coating film obtained is clearly inferior in chipping resistance.

Comparative Example 8 is an example in which property of the aqueous polyurethane resin (F) contained in the aqueous base coating composition is out of the range of claims according to the present invention. In these cases, the multilayer coating film obtained is clearly inferior in chipping resistance. In addition, it is also inferior in moisture-resistance (moisture blister resistance). Humidity resistance evaluation test is one type of water resistance evaluation test of the coating film.

In addition, the moisture resistance evaluation test is generally a severe evaluation test in which stricter conditions are imposed as compared with water resistance adhesion evaluation tests. Accordingly, also in Comparative Example 8, sufficient water resistance was not obtained as compared with the examples.

According to the examples and the comparative examples described above, an advantageous effect of the present invention such that a curing (crosslinking) reaction can be performed sufficiently under curing conditions at lower temperatures than before is demonstrated by forming a multilayer coating film using a specific aqueous intermediate coating composition and a specific aqueous base coating composition, especially by forming an uncured coating film using an aqueous intermediate coating composition containing the above-described specific components, and subsequently using an aqueous base coating composition containing an aqueous resin having a hydroxyl group and a carboxyl group (A2), a melamine resin (D), a weak acid catalyst (E) and an aqueous polyurethane resin (F) in specific amounts.

Moreover, it can be said that the technical significance of the present invention is proved sufficiently when the above demonstration is considered in connection with the mechanism of action imparted by the constitution of the present invention described herein.

INDUSTRIAL APPLICABILITY

The method for forming a multilayer coating film of the present invention is advantageous in that a curing reaction proceeds well even under heating conditions of low temperature conditions (e.g., heating conditions at 100° C. or less), so that a cured coating film having excellent coating film properties can be obtained. The method for forming a multilayer coating film of the present invention can be suitably used, for example, for coating an object to be coated having a steel plate part and a resin part. The method for forming a multilayer coating film of the present invention is also an effective method as a means for reducing an environmental load such as energy saving and $CO_2$ emission reduction.

What is claimed is:
1. A method for forming a multilayer coating film, wherein the method comprises:
   an intermediate coating film formation step of applying an aqueous intermediate coating composition to an object to be coated to form an uncured intermediate coating film;
   a base coating film formation step of applying an aqueous base coating composition onto a resulting uncured intermediate coating film to form an uncured base coating film; and
   a curing step of curing the resulting uncured intermediate coating film and the base coating film by heating, wherein
   the aqueous intermediate coating composition is an aqueous intermediate coating composition comprising:
      an aqueous resin having a hydroxyl group and a carboxyl group (A1);
      a polyisocyanate compound (B); and
      a hydrophilicized-modified carbodiimide compound (C),
   the aqueous base coating composition is an aqueous base coating composition comprising:
      an aqueous resin having a hydroxyl group and a carboxyl group (A2);
      a melamine resin (D),
      a weak acid catalyst (E); and
      an aqueous polyurethane resin (F), wherein
   the aqueous resin having a hydroxyl group and a carboxyl group (A1) contained in the aqueous intermediate coating composition has a hydroxyl value of 80 to 200 mgKOH/g and an acid value of 10 to 40 mgKOH/g in terms of resin solid content,
   the aqueous resin having a hydroxyl group and a carboxyl group (A2) contained in the aqueous base coating composition has a hydroxyl value of 80 to 200 mgKOH/g in terms of resin solid content,
   the hydrophilicized-modified carbodiimide compound (C) is a compound represented by a formula (I), (II), or (III) below,

[Chemical Formula 1]

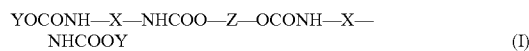

(I)

wherein each X is a bifunctional organic group having at least one carbodiimide group, Y is each same or different structure resulting from elimination of a hydroxyl group from a polyalkylene glycol monoalkyl ether, and Z is a structure resulting from elimination of a hydroxyl group from a bifunctional polyol having a number-average molecular weight of 200 to 5,000,

[Chemical Formula 2]

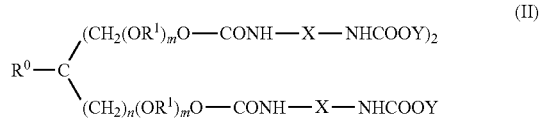

(II)

wherein each X is a bifunctional organic group having at least one carbodiimide group, Y is each same or different structure resulting from elimination of a hydroxyl group from a polyalkylene glycol monoalkyl ether, $R^0$ is hydrogen, a methyl group or an ethyl group, each $R^1$ is an alkylene group having 4 or less carbon atoms, n is 0 or 1, and each m is a number from 0 to 60,

[Chemical Formula 3]

(III)

wherein X is a bifunctional organic group having at least one carbodiimide group, and Y is each same or different structure resulting from elimination of a hydroxyl group from a polyalkylene glycol monoalkyl ether, and
the melamine resin (D) has an average imino group amount of 1.0 or more, and an average methylol group amount of 0.5 or more, per one melamine nucleus,
a mass ratio of the aqueous resin (A2) and the melamine resin (D) contained in the aqueous base coating composition is in the range of (A2)/(D)=0.7 to 3 in terms of solid content,
an amount of the weak acid catalyst (E) contained in the aqueous base coating composition is within the range of 0.1 to 10.0 parts by mass, based on 100 parts by mass of solid contents ((A2)+(D)) of the aqueous resin (A2) and the melamine resin (D) contained in the aqueous base coating composition,
the aqueous polyurethane resin (F) has a glass transition point (Tg) of −50° C. or less, and
a cured film of the aqueous polyurethane resin (F) has an elongation at break of 400% or more at −20° C.

2. The method for forming a multilayer coating film according to claim 1, wherein a content of the hydrophilicized-modified carbodiimide compound (C) is 1 to 8% by mass based on a resin solid content of the aqueous intermediate coating composition.

3. The method for forming a multilayer coating film according to claim 1, wherein a content of the aqueous polyurethane resin (F) is 8% by mass or more and 30% by mass or less based on a resin solid content of the aqueous base coating composition.

4. The method for forming a multilayer coating film according to claim 1, wherein
a ratio of an equivalent of a carbodiimide group of the hydrophilicized-modified carbodiimide compound (C) to an equivalent of an acid group of the aqueous resin (A1) contained in the aqueous intermediate coating composition is 0.1 to 0.6.

5. The method for forming a multilayer coating film according to claim 1, wherein
an amount of the weak acid catalyst (E) is within the range of 0.1 to 5.0 parts by mass, based on 100 parts by mass of solid contents ((A2)+(D)) of the aqueous resin (A2) and the melamine resin (D) contained in the aqueous base coating composition.

6. The method for forming a multilayer coating film according to claim 1, wherein the weak acid catalyst (E) comprises a phosphate ester compound.

7. The method for forming a multilayer coating film according to claim 1, wherein the aqueous base coating composition further comprises an aqueous resin (G) having a hydroxyl value of less than 80 mgKOH/g.

8. The method for forming a multilayer coating film according to claim 1, wherein the object to be coated includes a steel plate part and a resin part.

9. The method for forming a multilayer coating film according to claim 1, wherein the method further comprises a clear coating film formation step of applying a clear coating composition onto the uncured base coating film obtained in the base coating film formation step to form an uncured clear coating film, wherein
the curing step is a step of curing the resulting uncured intermediate coating film, base coating film, and clear coating film by heating.

10. The method for forming a multilayer coating film according to claim 1, wherein a heating temperature in the curing step is 70 to 120° C.

* * * * *